United States Patent
Kinter et al.

(10) Patent No.: US 11,823,159 B2
(45) Date of Patent: Nov. 21, 2023

(54) BUSINESS METHOD, APPARATUS AND SYSTEM FOR MONITORING QUANTITATIVE AND QUALITATIVE ENVIRONMENTAL ANALYTICS AND MANAGING ASSOCIATED FINANCIAL TRANSACTIONS

(71) Applicant: Resilience Financing Inc., Middletown, DE (US)

(72) Inventors: Saul Kinter, Potomac, MD (US); Sudhir Murthy, Herndon, VA (US); James Clarke, Washington, DC (US)

(73) Assignee: RESILIENCE FINANCING, LLC, Middletown, DE (US)

( * ) Notice: Subject to any disclaimer, the term of this patent is extended or adjusted under 35 U.S.C. 154(b) by 0 days.

(21) Appl. No.: 16/522,629

(22) Filed: Jul. 25, 2019

(65) Prior Publication Data

US 2020/0034814 A1 Jan. 30, 2020

Related U.S. Application Data

(60) Provisional application No. 62/703,417, filed on Jul. 25, 2018.

(51) Int. Cl.
*G06Q 20/40* (2012.01)
*G06Q 20/22* (2012.01)
*G06Q 40/08* (2012.01)
*H04L 9/40* (2022.01)

(52) U.S. Cl.
CPC ............ *G06Q 20/22* (2013.01); *G06Q 40/08* (2013.01)

(58) Field of Classification Search
None
See application file for complete search history.

(56) References Cited

U.S. PATENT DOCUMENTS

| | | | |
|---|---|---|---|
| 10,679,296 B1* | 6/2020 | Devereaux | G06V 20/176 |
| 2013/0191194 A1* | 7/2013 | Shreibati | G06Q 30/0209 |
| | | | 705/14.12 |
| 2015/0254782 A1* | 9/2015 | Riggs-Miller | G06Q 10/101 |
| | | | 705/30 |
| 2016/0284029 A1* | 9/2016 | Rhodes | G06Q 40/08 |
| 2017/0301220 A1* | 10/2017 | Jarrell | H04W 4/38 |

\* cited by examiner

*Primary Examiner* — Bruce I Ebersman
*Assistant Examiner* — Bhavin D Shah
(74) *Attorney, Agent, or Firm* — Sughrue Mion, PLLC

(57) ABSTRACT

Disclosed is a system, apparatus, and business method for using financial instruments to provide investment incentive to fund disaster mitigation projects and/or ecosystem restoration projects triggered by real world events detected at set points by sensors and analyzed by computing devices. The detection of events results in the computational analysis and determination of a characteristics of a resilience bond or ecosystem-service bond to be issued or returned to investors. Examples involve sensors used to detect events, including flood damage mitigation, earthquake damage mitigation, or air quality improvement. In one preferred embodiment of the disclosure an investor may make an initial payment into a financial instrument being a resilience bond used to fund a mitigation project, said financial instrument pays phases to the mitigation project developer at the completion of phases of the project that occur prior to the occurrence of a disaster.

6 Claims, 21 Drawing Sheets

BUSINESS METHOD, APPARATUS AND SYSTEM FOR MONITORING QUANTITATIVE AND QUALITATIVE ENVIRONMENTAL ANALYTICS AND MANAGING ASSOCIATED FINANCIAL TRANSACTIONS

CROSS-REFERENCE TO RELATED APPLICATIONS

The present application claims priority to U.S. Provisional Patent Application No. 62/703,417, filed Jul. 25, 2018. The entire disclosure of U.S. Provisional Patent Application No. 62/703,417 is incorporated herein by reference.

TECHNICAL FIELD

The general field of the disclosure herein relates to one or more financial transactions herein labeled bonds, for financing one or more disaster mitigation or environment restoration projects. These bonds may include but are not limited to Resilience Bonds, Restoration bonds, or a combination therein, herein labeled Resbonds.

BACKGROUND

Financial transactions have served as a means for raising capital and/or transferring risk for centuries. The earliest known government bonds were issued by the city of Amsterdam in 1517. Since then, national governments have issued bonds to raise money for a wide variety of purposes, from wars to dairy subsidies. Over time, bonds have evolved into different forms such as Corporate Bonds, Municipal Bonds, Mortgage Bonds and many others. Any bond includes (1) provision of principal from an investor to a recipient (such as a government or corporation) and (2) a promise of repayment in some form, usually with interest, often as regularly recurring payments.

Some bonds, as well as certain other financial instruments, include a conditional aspect to repayment. One example of this type of bond is the Catastrophe Bond. Catastrophe Bonds (U.S. Ser. No. 08/805,704 B2, U.S. Pat. No. 7,315,842B1) were first developed in the early 1990s following Hurricane Andrew as a means for transferring a specified set of risks from a sponsor to investors in the form of a risk-linked security.

In order to provide a catastrophe bond, an investment bank or insurance broker creates a special purpose reinsurance vehicle to issue bonds to capital markets and provide the sponsor organization (usually an insurance company) with reinsurance. If the catastrophe occurs, the principal of the Catastrophe Bond is used to fund the special purpose reinsurance vehicle's payments to the insurer instead of being returned to the investors. The investor's reward for taking on such a risk is the interest paid by the bond, which is necessarily higher than the corresponding interest rate for a similar bond that does not bear the associated risk of the investor losing the principal. Catastrophe bonds have been modified recently to require payout to the sponsor on the occurrence of specified "events that can be objectively verified, such as an earthquake reaching a 7.2 or higher" ("Catastrophe Insurance Risks: The Role of Risk-Linked securities and factors affecting their use," US General Accounting Office, Report to the Chairman, Committee on Financial Services, House of Representatives, Page 4, Diane Publishing, September 2002) on the Richter scale, i.e., to condition the payout more precisely. Such bonds can carry high associated expenses due to legal, accounting, and data costs needed to issue securities and market them to investors who have no contractual or business relationships with the insurance company receiving coverage. Additionally, US insurance regulators have the important yet difficult task of developing an effective measure to account for risk reduction for non-indemnity-based coverage so that insurance company filings with respect to risk evaluation and capital budgeting both reflect the risk retained.

A number of patents have been filed in the field of financial transactions associated with catastrophe assessment and risk management, including catastrophe hazard protection mortgage patents (US Patent 79,580,034), a system for securitizing catastrophic risk utilizing a computing device that measures debit in setting the rate of rebate for trigger events (Ser. No. 15/078,744), which in part modifies the terms of catastrophe bonds based on risk-mitigation measures, a process and method for writing supplemental catastrophic insurance and securitization of risk patents (WIPO Patent Application WO/2007/139966), and catastrophe insurance product design and servicing systems (WIPO Patent Application WO/2015/036307). Also relevant is tax-increment financing, a method created by the State of California in 1952, whereby a city funds repayment of an issued bond from the future tax revenue that results from increases in property values, usually in one specific area of a city.

The present disclosure differs from and seeks to improve upon the prior art in the form of (1) Resilience Bonds (or option, or other instrument including resiliency annuities and resiliency hybrid annuities), being the financial vehicle issued by or on behalf of an entity with preexisting exposure to some quantifiable risk to fund a mitigation project that can reduce said quantifiable risk; and (2) Restoration Bonds (or option or other instrument such as ecosystem service annuities and ecosystem service hybrid annuities), being the financial vehicle issued by an entity with the technical authority to develop an improvement project that can result in a tangible improvement or benefit to an area or ecosystem in order to fund said improvement; or any combination or bifurcation between the two. These two bonds collectively called Resbonds, are a part of a continuum of resilience financing instruments that promote a healthy and productive ecosystem within an urban planning design. These bonds use a combination in part or full of insurance, warranty and financing instruments to create a productive and resilient ecosystem or urban design. A combination of these approaches is likely and a subject of this invention where a project can mitigate a risk (such as pollution) and at the same time create a tangible improvement. Additionally, it includes not only the business methods to structure a plurality of embodiments of said financial transactions, but also the apparatuses and systems including tangible computing devices and/or sensors to calculate, facilitate, and process said financial instruments and/or monitor the real-world events that would trigger payments, termination, and/or other transactions associated with said financial instruments.

SUMMARY

The present disclosure is a business method, system, and apparatus for using financial instruments to provide investment to fund risk mitigation projects and/or ecosystem improvement projects, where the payment or repayment of all or part of the financial instrument is conditional upon at least one predefined criterion. The type of financial instrument thus used may be called by a variety of names including but not limited to a resilience bond or a restoration bond. The system and method employing such financial instruments can be utilized under specific threshold conditions, namely (i) the presence of a future, uncertain change in situation (an "event") for one party (known herein as the "original entity at risk"), which may be a positive or negative change, and is commonly a financial gain or loss; and (ii) the ability to take some action to alter the expected value of that change, through the reduction or elimination of damage or loss or the trigger of new value or growth (such action referred to herein as a "mitigation project" or "improvement project" without limitation). When these conditions exist, the action in part (ii) may require expenditure of funds. The financial instruments disclosed herein may be used to raise such funds from an investor, with repayment on a conditional basis, in contrast to, for example, a standard bank loan.

The benefits of such a transaction include, in whole, in part, or in combination depending on the circumstances: (i) a more direct connection between a project's value and its funding; (ii) a change in payoff matrix for the original entity at risk, such that the realized result of taking the action contemplated is always superior to not taking such action; (iii) a greater return for the investor; (iv) a securitized investment with a calculable value in a project that has an uncertain and/or widely varying return; and (v) better alignment of incentives for some or all parties with either or both their actual financial situation or the good of society as a whole.

The present disclosure includes, as one component, a method for (i) performing needed measurements and defining the terms of the financial transaction, and then (ii) determining whether and when the conditional payment or payments called for by those terms has been triggered. In the first step, one or more computing devices receive input, including parameters or limits on parameters preferred by the parties to the transaction such as but not limited to the risk exposure or anticipated growth, the desired bond length, and the principal needed to fund the mitigation project, then calculate based on that input a set of terms, usually including but not limited to when, at what frequency, and at what size a conditional payoff is to be made, or range of such sets appropriate for the financial transaction. In the second step, one or more episodic sensors (including acute or chronic event detectors) provide input to one or more computing devices, which analyze said input and determine whether, when, and to what extent one or more pre-determined events have occurred. Should the events have occurred as specified in said financial transactions, the appropriate payout is made by the original entity at risk to the investor.

The present disclosure includes, as another component, a system for (i) performing needed measurements and defining the terms of the financial transaction, and then (ii) determining whether and when the conditional payment or payments called for by those terms has been triggered. The system includes one or more computing devices configured to receive input, including parameters or limits on parameters preferred by the parties to the transaction such as but not limited to the risk exposure or anticipated growth, the desired bond length, and the principal needed to fund the mitigation project, then calculate based on that input a set of terms, usually including but not limited to when, at what frequency, and at what size a conditional payoff is to be made, or range of such sets appropriate for the financial transaction. The system also includes one or more episodic sensors (including acute or chronic event detectors) that are configured to provide input to one or more computing devices, which are configured to analyze said input and determine whether, when, and to what extent one or more pre-determined events have occurred. Should the events have occurred as specified in said financial transactions, the appropriate payout is made by the original entity at risk to the investor.

The present disclosure includes, as another component, a computer program to (i) performing needed measurements and defining the terms of the financial transaction, and then (ii) determining whether and when the conditional payment or payments called for by those terms has been triggered. The computer program includes instructions to cause one or more computing devices to receive input, including parameters or limits on parameters preferred by the parties to the transaction such as but not limited to the risk exposure or anticipated growth, the desired bond length, and the principal needed to fund the mitigation project, then calculate based on that input a set of terms, usually including but not limited to when, at what frequency, and at what size a conditional payoff is to be made, or range of such sets appropriate for the financial transaction. The computer program also includes instructions to cause one or more episodic sensors (including acute or chronic event detectors) to provide input to one or more computing devices, and instructions to cause those computing devices to analyze said input and determine whether, when, and to what extent one or more pre-determined events have occurred. Should the events have occurred as specified in said financial transactions, the appropriate payout is made by the original entity at risk to the investor.

In all embodiments of the disclosure, it is necessary that there be a future, uncertain change in the situation, usually financial, of the original entity at risk due to one or more events. This change must be quantified, which may be done in its simplest form as exposure (E) to the change is equal to the likelihood (L) of the change occurring multiplied by the magnitude (M) of the change: $E=M*L$. Should said change be negative, the exposure may be offset by the construction, implementation, or other realization of a mitigation project. A mitigation project reduces the likelihood of an event, the magnitude of an event, or both. The original entity at risk's exposure to an event will thus be reduced after the mitigation project is built. Should said change be positive, the exposure may be induced by the construction, implementation, or other realization of an improvement project. An improvement project increases the likelihood of an event, the magnitude of an event, or both. Common events include but are not limited to the occurrence of a disaster or the realization of an ecosystem benefit.

When the expected value of an event is negative (that is, it would cause loss to the original entity at risk), a mitigation project reduces its potential impact, and the financial instrument takes the form of a resilience bond. Commonly but not exclusively, the event is some sort of natural disaster. Examples include but are not limited to earthquakes, floods, power outages, hurricanes, an increase in the number of automobile accidents, or heat waves. Mitigation projects associated with such events may respectively include but are not limited to vibration dampening construction projects, the construction of additional levees, baffles, and floodwalls, the construction of onsite power systems and/or microgrids, the construction of additional emergency escape routes and hurricane rescue services, an investment in grid networking solutions that better interact with self-driving cars, or the installation of white roofs solar panels and green roofs to combat global warming. Large scale 'geoengineering' global warming mitigation projects such as sulfur dioxide injection in the stratosphere to reduce the intensity of solar radiation, or cooling the surface waters of the Atlantic Ocean using a water siphon system to reduce or control the occurrence of hurricanes can also be funded using these resiliency financial instruments When the expected value of an event is positive (that is, it would create gain to the original entity at risk), an improvement project increases its potential impact, and the financial instrument take the form of a restoration bond. Examples of such events include but are not limited to reductions in pollution, increases in eco-tourism or fisheries revenue, improvements to navigation, increases in property value, decreases in occurrence of disease, or increases in human longevity. Improvement projects associated with such events may respectively include but are not limited to the construction of clean power plants or improved odor scrubbers, local-river and tributary beautification projects, waterfront and wharf development, cloud seeding projects, installation of improved signage and directions to historic areas, community beautification projects, diverting farm crop stubble burning (and its resulting air pollution) to funding resource recovery, or air treatment systems to improve indoor or outdoor air quality.

In some instances, an opportunity may occur for an entity to have both negative and positive exposure. In such cases, a project may simultaneously improve the potential gain of a positive-value event and mitigate the potential loss of a negative-value event, and be both a mitigation project and an improvement project. Examples of such projects include afforestation, which may serve to both mitigate damage from hurricanes and increase property values through beautification or water quality improvements, and dams, which may serve to both mitigate downstream damage from floods and increase property values through added recreational opportunities.

In some embodiments of the present disclosure, incentives to fund one or more mitigation projects or improvement projects or the payouts associated with them may include but are not limited to financial instruments or payments which may be triggered by one or more real world events as detected at one or more set points by one or more episodic sensors (including acute or chronic event detectors), and analyzed by one or more computing devices, the detection of said events at said set points resulting in the computational analysis and determination of a plurality of characteristics of the resilience bond or restoration bond to be issued or returned. Variations of this disclosure include embodiments where episodic sensors are used to detect specific events, including but not limited to flood damage, power outages, earthquake severity measurements, a comparison of the height of the flood wall constructed to the height of the occurring flood, or quantifiable air, water or soil quality change for a time of year in a given area.

In one preferred embodiment of the disclosure an investor may make an initial payment into a financial instrument being a resilience bond used to fund a mitigation project, and said financial instrument pays installments in phases to the mitigation project developer on behalf of the original entity at risk at the completion of a plurality of phases of the project that occur prior to the occurrence of a disaster. In some such embodiments if the disaster that mitigation is sought for occurs after the completion of said project but before the financial instrument expires, the original entity at risk would pay the investor a previously-agreed, or independently calculated, amount greater than the amount originally paid for the mitigation project by the investor on behalf of the original entity at risk. This could incentivize not only the initial investment and mitigation project that benefits the investor, but also the developer timely completion the project and each of its phases.

In other embodiments of the disclosure, responsibility for the construction, implementation, or realization of the mitigation project or improvement project may rest with the investors, the original entity at risk, a third party agreeable to both, or some combination thereof. In such embodiments, the performance of such mitigation or improvement project to its design specifications and/or intent may be an additional contingency to the occurrence of an event on the repayment of the financial instrument.

Episodic sensors are sensors being used to measure acute or chronic events (being events subject to a repetitive pattern). They can be used to detect the occurrence and severity of events triggering payouts of resilience bonds, and in some cases, events used to measure benefits including but not limited to pollution reduction and air quality improvement or population increase. Additionally, sensors linked to computing devices may be used to inform the development of the terms of the financial instruments by determining the values of needed inputs or performing analysis to determine a range of acceptable terms within which negotiations may take place. Prognostics, forecasting and analytics could also be included to provide guidelines on likelihood of event occurrence that will result in a payout. Investors may buy or sell said financial instruments based on such prognostics or analytics.

Another preferred embodiment of this disclosure may be a system of episodic sensors being used for seismic wave detection, sending signals to one or more computing devices, at least one of which is running a historian program for analysis of data detected by the episodic sensors against historical data regarding the occurrence of earthquakes at or above one or more predefined set points (in this case being one or more earthquake magnitudes being used to determine the level of payout that will be triggered by the financial instrument, in this case being a resilience bond). In some such embodiments multiple payments may be triggered depending on the number of events that occur in a predetermined time and the severity of those events. In other cases, payouts can occur based on a scalar (magnitude change) or vector change (magnitude and direction) of an event such as damage caused by wind speed versus wind velocity. Different magnitudes for example can result in different payouts that may or may not be coupled with wind direction.

Similarly, the payouts can have magnitude and direction. The magnitude of payout can vary based on determined or pre-determined triggers or setpoints, and the directionality of the payout depends on the outcome. The directionality can be unidirectional, bidirectional or multidirectional between OEAR, sponsor, issuer, investor, insurer or a third party. The associated instrument being triggered can be separate or bundled insurance, warranty, bond, annuity or any form of financial instrument that can be coupled with contingent payments. The insurance can be parameterized.

In other such embodiments sensors may be used for the detection of other real-world events, such as wind speed sensors used to determine the presence and/or severity of a hurricane, air quality sensors to detect air quality which is below the threshold required to trigger a resilience bond, or flow sensors located at a wastewater treatment plant used to measure population and tourism growth. In each of the aforementioned embodiments an event is a real-world state, situation, happening, or circumstance or set of several such things, whereby its or their occurrence or lack thereof is used as the condition for a payment to be made or not made in the financial instrument.

In other embodiments, such sensors, computing systems, or other methods of verification may be employed by a third party mutually agreed upon by the original entity at risk and the investor, where such third party is informed as to and knowledgeable of the terms of the financial instrument, including any set points that may be fixed, enabling said third party to act as a neutral umpire in determining when a payout or payouts may be triggered.

In some preferred embodiments of this disclosure, repayment may be made through means other than a single, one-time payment, such as a series of payments over time where the commencement of the series is triggered by the occurrence of an event, a set of payments varying in size made based on the magnitude of an event as may be measured by one or more sensors, or multiple potential payments where one such payment is made each time an event occurs during the duration of the bond. In some examples, variants may come in various forms including but not limited to allowing the entity at risk to pay back the investor over time or in other cases paying out interest over time. It is expected that interest in some such forms could be less than, equal to, or greater than would be expected than if purely a revenue bond of the same principal, depending on the circumstances informing the issuance of the bond. In some such embodiments payments over time where the bond carries interest payments in addition to the conditional payout, where the return is higher/lower, depending on the likelihood that the conditional payout is made. The term contingent and conditional are analogous and can be interchanged.

Other such embodiments include those where the bond may be coupled to an insurance contract. For example, a resilience bond to collect $100 may have a triggered payout of $0 if no disaster strikes or a $1K payout condition (which payout amount must be less than the damage that would have been caused by the disaster had the mitigation project not been constructed). The entity at risk may buy insurance on the payout. If not for the bond, the entity at risk would have had a similar or equal likelihood of a larger payout and have to pay more premiums. Insuring the payout of a resilience bond shifts the (reduced) risk of a large payout from the original entity at risk to the insurer.

In some exemplary embodiments, calculations may be used to make adjustments to the principal, time period, return amount or other variable using intelligent means for calculating adjustments including but not limited to Artificial Intelligence or Machine Learning.

In other embodiments, the change in financial situation of the original entity at risk may be nonmonetary, in the sense that the financial value is implied, unquantifiable, or otherwise not specifically defined. Examples of such circumstances include an improvement in air quality or water quality, which may reduce incidence of disease and thereby provide a financial return, but which return may be difficult to specify.

In other embodiments, the change in situation of the original entity at risk may be nonfinancial, in the sense that some or any monetary value is implied, unquantifiable, or otherwise not specifically defined, or in the sense that the OEAR measures value in a nonfinancial way. Examples of such circumstances include an improvement in air quality or in water quality, either of which may reduce incidence of disease and thereby provide a financial return, but which return may be difficult to specify, or an afforestation project that provides habitat for an endangered species, where a goal of the OEAR is the preservation of that species.

Likewise, the prior art has generally never connected conditional payments with positive improvements, especially in the context of environmental improvements. The present disclosure includes restoration bonds in which funding is provided by investors to original entities desiring improvements, where repayment is made only when and if such improvements are made, to the extent that the parties predetermined.

BRIEF DESCRIPTION OF THE SEVERAL VIEWS OF THE DRAWINGS

The accompanying drawings which are incorporated in and form a part of the specification, illustrate several embodiments of the invention wherein.

DETAILED DESCRIPTION

Figure 1:
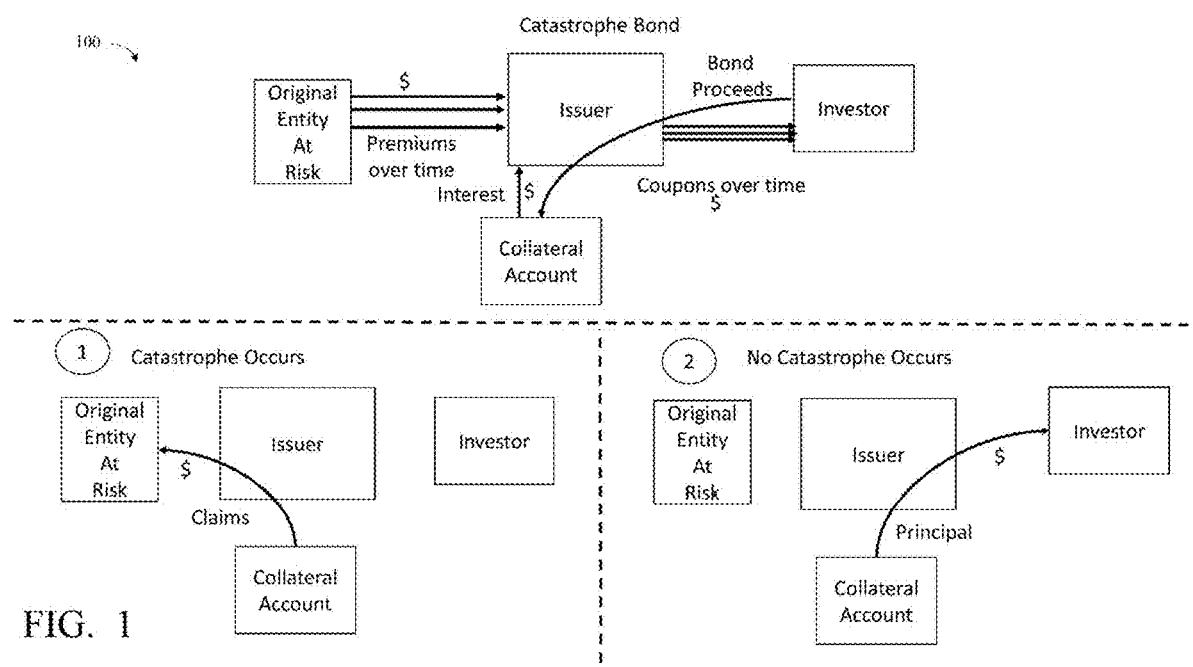
FIG. 1 is a drawing showing current practice, namely, a catastrophe bond.

In this disclosure the term 'predetermined goal' is an established predetermined setpoint that may be defined by the party allotted to or allotted by before the financial instrument is initially invested. For instance, this could be but is not limited to an amount of pollution reduction, increased tourism, millions of gallons per day of additional waste water treated, or some other occurrence that when achieved will trigger an automated release of a financial instrument or a portion thereof from the party allotted by. An event is a real-world state, situation, happening, or circumstance or set of several such things, whereby its or their occurrence or lack thereof is used as the condition for a payment to be made or not made in the financial instrument. Exposure to risk can be quantified as a likelihood and a magnitude. Written mathematically Exposure (E) may be equal to likelihood of an event occurring (L)×the magnitude of the Event (M). Exposure=L×M. The exposure to risk may be offset by the funding of a mitigation project the principal helps to fund. A mitigation project reduces the likelihood an event, magnitude of the event, or both. The original entity at risk's exposure to an event will thus be reduced after the mitigation project is built In certain embodiments the party allotted to may be the party that is funded by investments from Resilience Bonds (or annuity, or other financial instrument) or Restoration Bonds (or annuity, or other financial instrument). This may include but is not limited to water and wastewater treatment facilities, power plants, or capital improvement construction contractors.

In certain embodiments the party allotted by may be the party that pays into the Resilience Bonds or annuity or Restoration Bonds or annuity as a form of investment. This can include but is not limited to interested citizens, companies with business based on tourism, insurance companies, impact investors or investment banks.

In typical embodiments, a township or governmental entity does not have the available cash or borrowing capacity to make an investment to avert a flood or other disaster or reduce the damage such a disaster would cause, or to build a project to manage the water quality/quantity of a lake, reservoir or river. The external market has funds to invest in such projects. Investors can own/invest in build-own-operate-transfer (BOOT) projects or invest in hybrid annuities (a combination of a fixed and variable rate of return) to avert an acute flood or to prevent a more chronic drought. The payout on the variable rate of return is made by the governmental entity if the project results in a benefit such as tangible flood or drought mitigation, or the improvement to the ecosystem through a windfall increase in revenue from tourism, tax receipts or gainful employment. The improved cashflow (positive or negative) associated with an averted disaster or improved revenue makes such payouts easier. Hybrid annuities can also include a fixed capital project payment disbursed over a short period of construction time and a longer-term operational annuity contingent payment (over a 15-20 year period for example), the payment being contingent on performance. The hybrid annuity assures that a constructed mitigation (for Resilience Bond) or improvement (for Restoration Bond) project is operated in a manner that assures the desired performance of project or infrastructure and in some cases mitigates additional risks that may transpire or accrue or makes additional improvements over time that can eventually result in a higher payout. Other approaches (beyond hybrid annuity) to achieve similar results are also possible.

Such incentives to actively manage risk (active de-risking) or improvement (active and continuous improvement) based on prognostics or diagnostics can be provided in a series of nested unidirectional, bidirectional or multidirectional one-time or periodic contingent payouts for project performance or non-performance, and also for overall societal benefit for a higher eventual payout. Other approaches can be used to develop or maintain warranties and performance guarantees associated with a project that are used to assure or manage risk. In one example, a levee may be built to mitigate the risk of a flood. The warranty associated with the levee meeting its performance can be insured or guaranteed by a bank or its own bond. The likelihood of the levee being overtopped could be insured and the likelihood of the levee being protective can have its own 'pay to protect' premium. These three bond and/or insurance instruments can be separate or bundled and parameterized using episodic sensors that evaluate the payout based on triggers for each insurance that may have its own single or multiple unidirectional or bidirectional contingent payment terms. Anthropogenic conditions (such as upstream increase in impervious surface conditions that worsen a likely flood) that can create adverse impacts can in addition be considered using sensors and within triggers and contingent payments or its own insurance or financing approach. The different insurance schemes can be bought by different parties including the OEAR, but also contractors and investors. In some cases, a contractor and investor can team up as a single consortium to assure success of project. In other cases, a contractor can team up with a developer that can assure increase in real estate value or tourism. Such incentivized consortium teaming arrangements can increase likelihood of project success. For example, if the investor and contractor jointly assure the maintenance of a wall or levee to perform as desired, they can assure a contingent payout from an OEAR and actively assure the ongoing resilience of a system or watershed. Such active management can be assured if benefits (including but not limited to tax increments or stamp duty from a purchase or sale of a property) that are realized from active management are used to incentivize such management practices. These active management approaches can be key where climate change or anthropogenic development can create adverse impacts that need active mitigation projects that combat such risk by reducing disaster related premiums and benefits are partly or wholly transferred to the party managing mitigation. Similar considerations can be used for active management of an ecosystem for a pollutant or pollutants where increased wealth can be used to actively and near perpetually used to manage the ecosystem. These 'virtuous cycles' need to be tended and cared for often by third parties that provide prognostics and diagnostics. These parties can also participate in an 'overhead' that can be charged to manage this system.

Among the novel features of the present disclosure are the use of a resilience bond that allows an investor to make an investment or multiple investments to an original entity at risk (OEAR) so that the entity may pay for a mitigation project directly, said OEAR paying back the investor said principal and a calculated return if a catastrophe occurs (both of which are less than the damages that would otherwise have occurred but for the mitigation project) or making no payment if no catastrophe occurs such that the OEAR always winds up in a better predicament than it would have without the investment and mitigation project, and the investor having a higher probability of making a profit from the investment (often times a much higher profit) than taking on a loss (said loss only being the loss of principal), and in some embodiments using computing devices (often maintained by a third party adjudicator) to calculate a valid principal and return, calculate the occurrence of a catastrophe or probability thereof by measuring and accurately predict changes, break even points and mean profitability based on the data collected and transmitted by episodic sensors at any number of set points, or an ecosystem service bond in which a principal is paid to the original entity by an investor to make certain improvements to the ecosystem, and once said improvements are made and a desired tangential benefit as predetermined at a set point is achieved the original entity is to pay the investor back the principal plus a return amount. A set point is defined as the predefined point a computing device is directed to process or conduct an action at. In some cases that action may be the issuance of a financial instrument such as a resilience bond/annuity or ecosystem-service bond/annuity to the party the financial instrument was originally allotted by in the event of a loss or occurrence of a disaster or is to be allotted to in the event that a benefit is achieved or a project is completed. A loss is the occurrence of an event that moves in the opposite direction of the desired impact of a mitigation project or a capital improvement project, such as a capital improvement project where the desire is an increase in tourism but the event shows tourism has decreased, or a disaster mitigation project designed to protect against flood damage, but the completion of which fails to protect facilities from the next flood. Variations may be made to the bond structure itself. In some examples, variants may include but are not limited to allowing the entity at risk to pay back the investor over time or in other cases paying out interest over time. It is expected that interest would be less in some such forms than would be expected than if purely a revenue bond. In some such embodiments payments over time where the bond carries interest payments in addition to the conditional payout, where the return is higher/lower, depending on the likelihood the get the conditional payout. Other such embodiments include those where the bond may be coupled an insurance contract. For example, an issue bond to collect $100 may have a triggered payout of $0 if no disaster strikes or a $1K payout condition. This is still less than the damage that would have been caused by the mitigation project had the disaster occurred without it. The entity at risk may buy insurance on their financial instrument. If not for the bond the entity at risk would have had a likelihood of a bigger payout and have to pay more premiums. Insuring ensures a much smaller loss thanks to the mitigation project. In some exemplary embodiments calculations may be used to make adjustments to the principal, time period, return amount or other variable using intelligent means for calculating adjustments including but not limited to Artificial Intelligence or Machine Learning. In some such cases a variable rate or fixed rate bond can be used as a base instrument and the bidirectional conditional payouts can occur based on the prevention of loss or the non-prevention of loss.

One exemplary embodiment of the present disclosure involves a system for monitoring quantitative and qualitative environmental analytics and for managing associated financial transactions. In some such embodiments the system would involve one or more episodic sensors sending signals that directly or indirectly informs one or more computing devices and/or users operating computing devices, where at least one of those computing devices is running a historian program that is used for the analysis and/or modeling of data detected by the episodic sensors, and at least one of the computing devices triggers financial transactions involving one or more financial instruments when one or more predetermined goals is achieved. For example, a group of pollution reduction goals may be set calling for no nitrate emissions over 15 ppm, 10 ppm, or 5 ppm from a particular wastewater treatment plant over the course of a year. A company that would payout for an improvement being a local fishing company. External impact investors or other financing firms may pay into to an ecosystem-service bond part of which funds are then used to pay for the sensors and equipment that both monitor the effluent discharge from the local wastewater treatment plant and contribute to the phosphorus removal and treatment of the wastewater such that one of the predetermined goals of 2 ppm, 1 ppm, and 0.1 ppm may be achieved. If any of these predetermined goals is met, a portion of the financial instrument would be paid out at the end of the year (or as per a plan) to the owner or investor of the wastewater treatment plant. If all of the predetermined goals are met (or, alternatively, if the most demanding of the predetermined goals is met), the financial transaction would result in a payout of the entire financial instrument to the investor/owner of the wastewater treatment plant. If instead the goals fail to be met, the investor loses the money invested. The sensors communicating with the computing devices would control the financial transactions and the release of payment. In some such embodiments they could also be used to predict the likelihood of success and in some other embodiments the amount that should be contributed as a break even based on the probability of success. Other approaches/metrics include monitoring the improvements in the ecosystem itself, such as the increase in the dissolved oxygen or the duration of its improvement in a lake or river, the reduction in algae or chlorophyll, the increase in underwater vegetation, the increase (or decrease) in volumetric flows associated with a water body prone to drought (or flood) or the rebounding of fish stocks. Still other approaches/metrics could include increase in hotel occupancy rates beyond baseline resulting in a premium offered for fish sales. Other examples of parties 'paying' for an outcome of an episodic event include but are not limited to tourism companies, hotels, city or local governments vested in seeing an increase in water availability or property taxes. In one exemplary embodiment of an ecosystem investment, other investors can 'short' the likelihood of the episodic event or an improvement to the ecosystem, while the city, tourism, fishing entity or other impact investors makes the desired investment. In this case, the investor that 'shorts' the event occurrence pays out if the improvement occurs and receives a payout if the improvement does not occur. Another exemplary embodiment of the present disclosure would be an apparatus comprising: one or more computing devices, processing the rate of occurrence of and the damage or benefit associated with one or more real world events within a financial transaction between two or more parties, comprising a duration, a rate of return, and a principal amount. This processing could be used to determine the profitability associated with the occurrence or non-occurrence of one or more real world events, mean profitability, appropriate issuing time, and/or party or parties of one or more financial instruments to be allotted when one or more of said real world events occurs. For example, a computing device or series of computing devices could be used to calculate the damage caused by the occurrence of a 100-year flood to a local town at sea level, estimate the cost of the damage to the township, the value of investing in a resilience bond that could be used to fund a mitigation project involving the building of baffles on one hand, a dam on the other hand, or a series of dams and baffles. The township investing in said mitigation projects would not pay out for the projects (or alternately be reimbursed) if the flooding never occurs again, but if it occurs, when it occurs, a $3^{rd}$ party including but not limited to an investor, insurer, or the engineering company would be paid handsomely by the financial instrument for the damage averted. All of these financial transactions, and the price of the financial instruments based on the probability of flooding could be managed by the apparatus preferably controlled by a third party in some such embodiments.

In one more embodiment, a water utility owns premium land next to a river or lake. The investor decides to invest and pay the difference in building an underground plant and to invest the land in a higher revenue seeking project. The benefits associated with the investment (higher taxes or more tourism) is made as a payout to the investor.

Yet another exemplary embodiment of the present disclosure is a business method comprising: allotting one or more financial instruments at predetermined set points as triggered by one or more respective real world events, said real world events being either the achievement of a predetermined goal (say a minimum 20% decrease in insurance premiums, a minimum 20% decrease in risk over a period of time associated with the mitigation project or a minimum 20% improvement associated with preserved wealth or asset value) by the party allotted to, or the occurrence of an event that causes losses to the party allotted to or by or would cause loss to the party allotted by but for the establishment of a mitigation project created by the party allotted to and funded by said financial instrument.

In some such embodiments the achievement of a predetermined goal (say a minimum 20% increase in wealth or produced value including from tourism or improved health) would be the achievement of a desired ecosystem boon resulting in an invested in ecosystem-service bond/annuity issuing a financial transaction to the party allotted to, or the non-achievement of said boon resulting in a financial transaction back to the party allotted by. In other such embodiments the occurrence of an event causing loss to the party allotted to and/or by would be a disaster resulting in losses to the investor(s) and/or possibly the party responsible for the mitigation project causing them to be unable to continue with said project (such as a hurricane occurring before the company building levees is able to complete the levees and their progress thus-far is destroyed and can no longer pay for finishing the project at the predetermined rates or time frame) resulting in the financial transaction being allotted back to the party allotted by, or the event would have caused loss to the party allotted by but for the completion or further damage but for the partial completion of the mitigation party by the party allotted to, or the investment of the party allotted to, thus resulting in the financial transaction being paid out to the party allotted to, or some portion thereof.

A third-party entity entrusted in managing the airshed, watershed or coastline may be selected to arbitrate, oversee, or adjudicate the overall process. This third-party entity can be charged with owning the data, managing and maintaining a transparent digital airshed or watershed with sensors or detection devices, and with providing a dashboard of key parameters and metrics that could result in a payout associated with an event.

It is understood that the various disclosed embodiments are shown and described above to illustrate different possible features of the disclosure and the varying ways in which these features may be combined. Apart from combining the features of the above embodiments in varying ways, other modifications are also considered to be within the scope of the disclosure. The disclosure is not intended to be limited to the preferred embodiments described above, but rather is intended to be limited only by the claims set out below. Thus, the disclosure encompasses all alternate embodiments that fall literally or equivalently within the scope of these claims.

Some of the preferred embodiments of the present disclosure are illustrated in the attached drawings:

FIG. 1 is an overview drawing showing a diagram 100 for a catastrophe bond in the prior art, which is the typical practice currently. The investor provides funds through an issuer into a collateral account, which pays said issuer interest; an Original Entity at Risk (OEAR) pays premiums over time to the issuer. From the interest and premium cashflow, the issuer funds coupon returns to the investor. If no catastrophe occurs prior to the conclusion of the Bond's term, the funds in the collateral account returns to the investor as principal; if, however, a catastrophe takes place, the OEAR is paid out of the collateral account to cover resulting losses.

Figure 2:
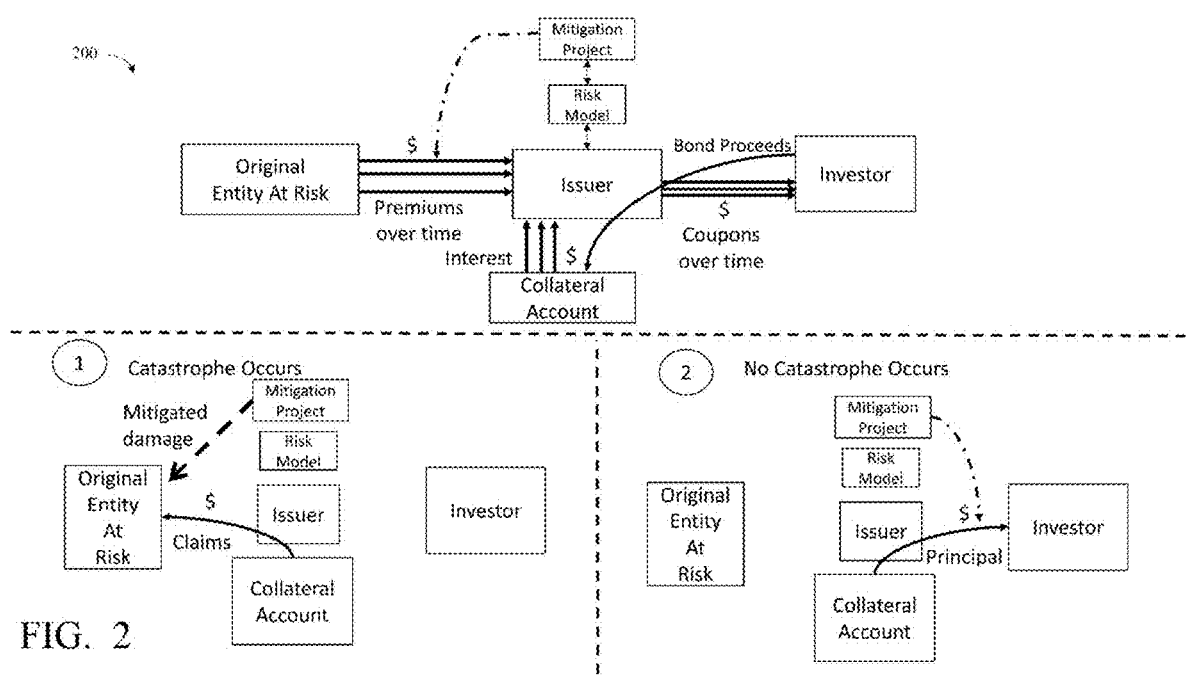
FIG. 2 is an overview drawing of an example implementation of a risk model framework in prior art, in which a catastrophe bond is altered by the existence of a mitigation project.

FIG. 2 is an overview drawing of an example implementation of a risk model framework 200 in prior art, in which a catastrophe bond is altered by the existence of a mitigation project. As with a catastrophe bond, an investor provides funds through an issuer to a collateral account, and an Original Entity at Risk (OEAR) pays premiums over time to the issues. From the interest and premium cashflow, the issuer funds coupon returns to the investor. If no catastrophe occurs prior to the conclusion of the Bond's term, the funds in the collateral account return to the investor as principal; if, however, a catastrophe takes place, the OEAR is paid out of the collateral account to cover resulting losses. The modification here to an ordinary catastrophe bond stems from the existence of the mitigation project. A risk model takes information about the altered potential loss, and that information is used to modify the premiums paid by the OEAR and the principal returned to the investor. In the event the catastrophe occurs, the mitigation project reduces the OEAR's losses.

Figure 3:
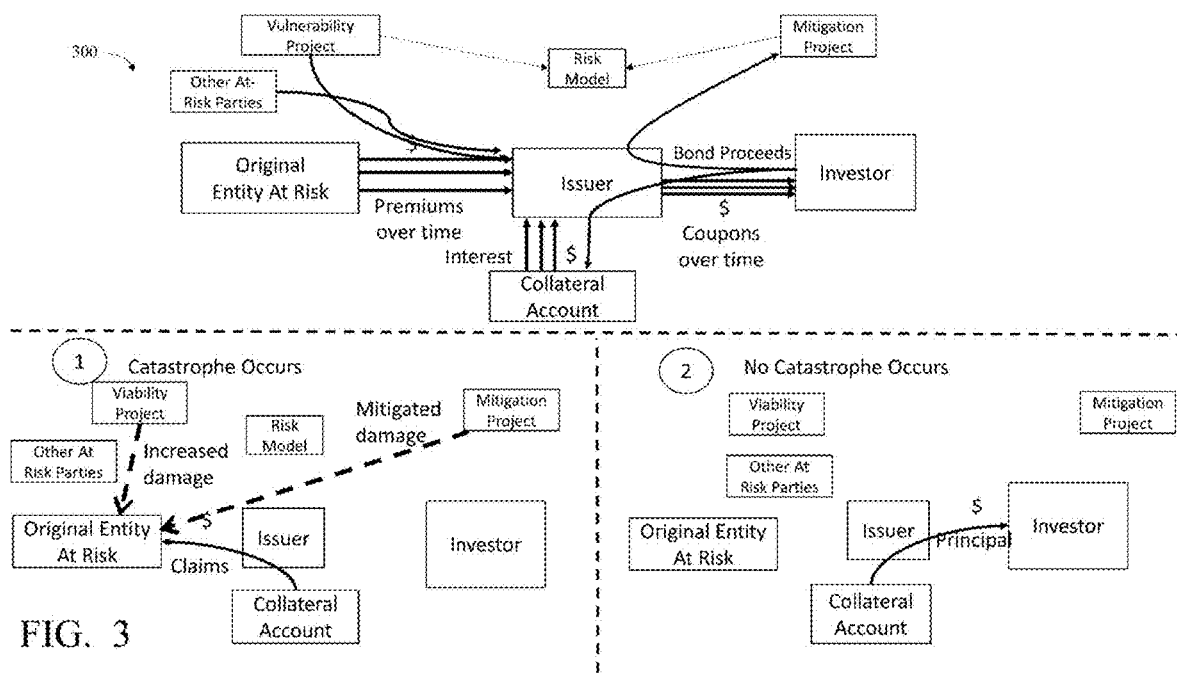
FIG. 3 is an overview drawing of an example implementation of a risk model framework in prior art, an investor provides funds through an issuer to fund a mitigation project and into a collateral account which pays said issuer interest; an OEAR pays premiums over time to the issuer.

FIG. 3 is an overview drawing of an example implementation of a risk model framework 300 in prior art, in which an investor provides funds through an issuer to fund a mitigation project and into a collateral account which pays said issuer interest; an OEAR pays premiums over time to the issuer. Additionally, this implementation contemplates the existence of a vulnerability project, which increases the potential loss from the catastrophe, and other at-risk parties, both of which also pay premiums to the issuer. From the interest and premium cashflow, the issuer funds coupon returns to the investor. If no catastrophe occurs prior to the conclusion of the Bond's term, the funds in the collateral account return to the investor as principal; if, however, a catastrophe takes place, the OEAR is paid out of the collateral account to cover resulting losses. In the event the catastrophe occurs, the mitigation project reduces the OEAR's losses and the vulnerability project increases them.

Figure 4:
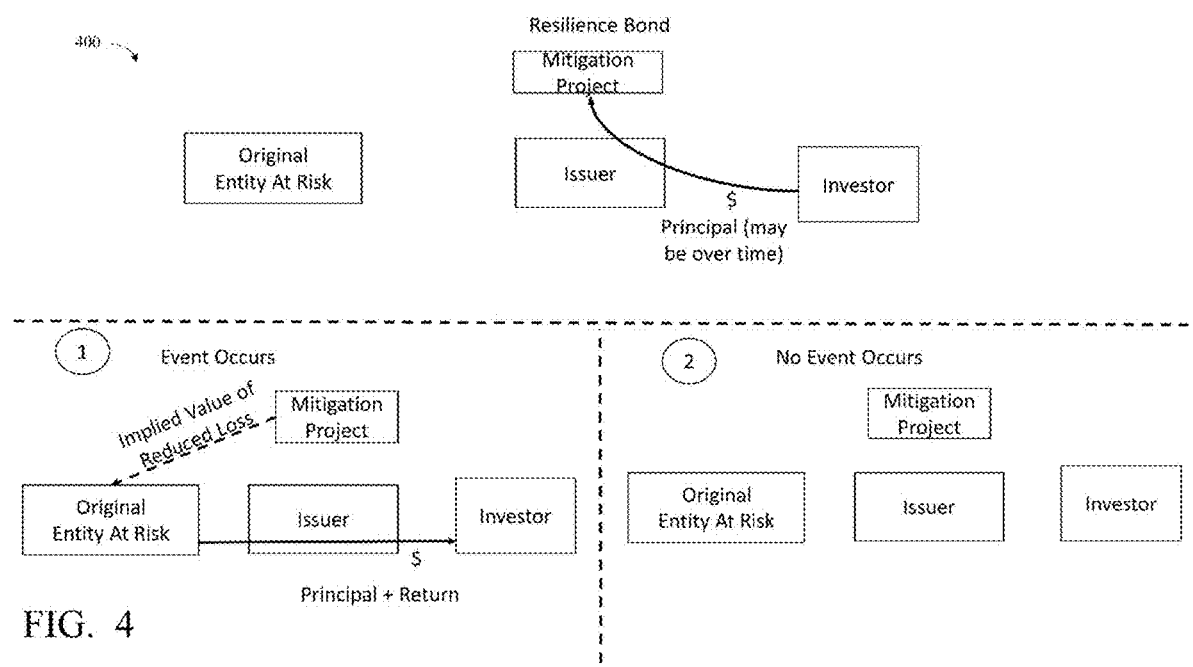
FIG. 4 is an overview drawing of flowchart for a Resilience Bond, in which a Mitigation Project is funded by an investor, with the investor providing funds through an issuer via one or more principal payments, which may be made over time.

FIG. 4 is an overview drawing of flowchart 400 for a Resilience Bond, in which a Mitigation Project is funded by an investor, with the investor providing funds through an issuer via one or more principal payments, which may be made over time. If no event occurs prior to the conclusion of the Bond's term, no payments are made; if, however, an event takes place, the OEAR pays the principal plus a suitable return to said investor via said issuer. The mitigation project reduces loss to the OEAR should an event occur, thus providing implied value to the OEAR.

Figure 5:
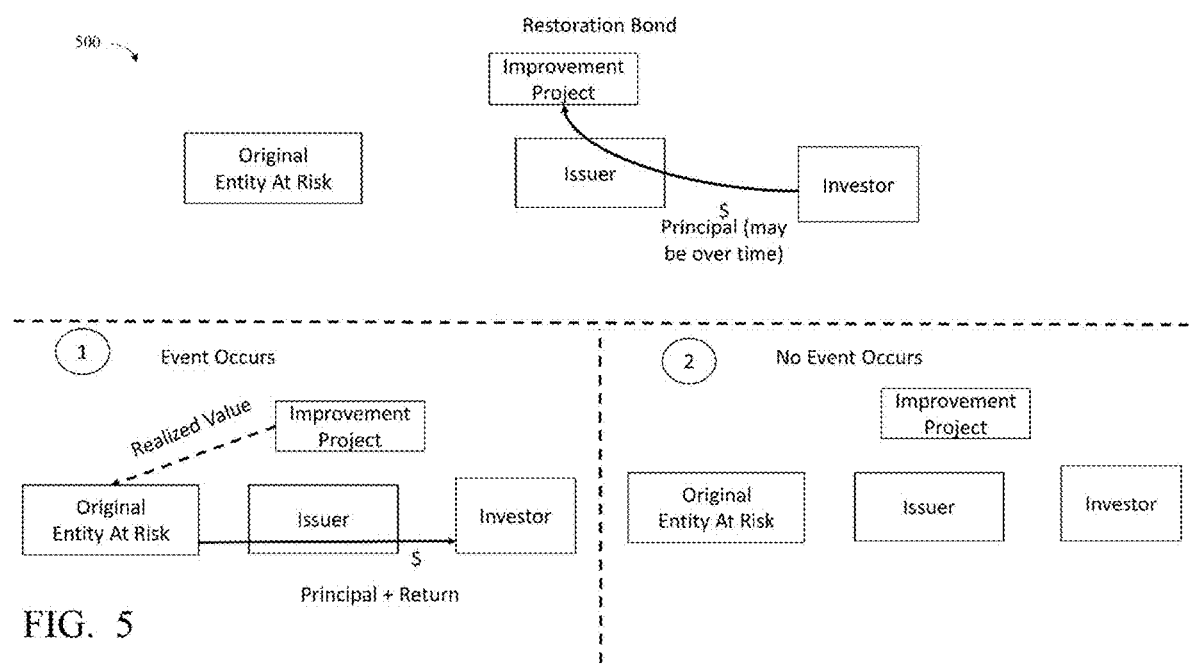
FIG. 5 is an overview drawing of flowchart for a Restoration Bond, in which an Improvement Project is funded by an investor, with the investor providing funds through an issuer via one or more principal payments, which may be made over time.

FIG. 5 is an overview drawing of flowchart 500 for a Restoration Bond, in which an Improvement Project is funded by an investor, with the investor providing funds through an issuer via one or more principal payments, which may be made over time. If no event (or trigger) occurs (or is reached) prior to the conclusion of the Bond's term, no payments are made; if, however, an event takes place (or a trigger is reached), the OEAR pays the principal plus a suitable return to said investor via said issuer. The Improvement Project creates value for the OEAR should an event occur, thus providing real or implied value to the OEAR.

Figure 6:
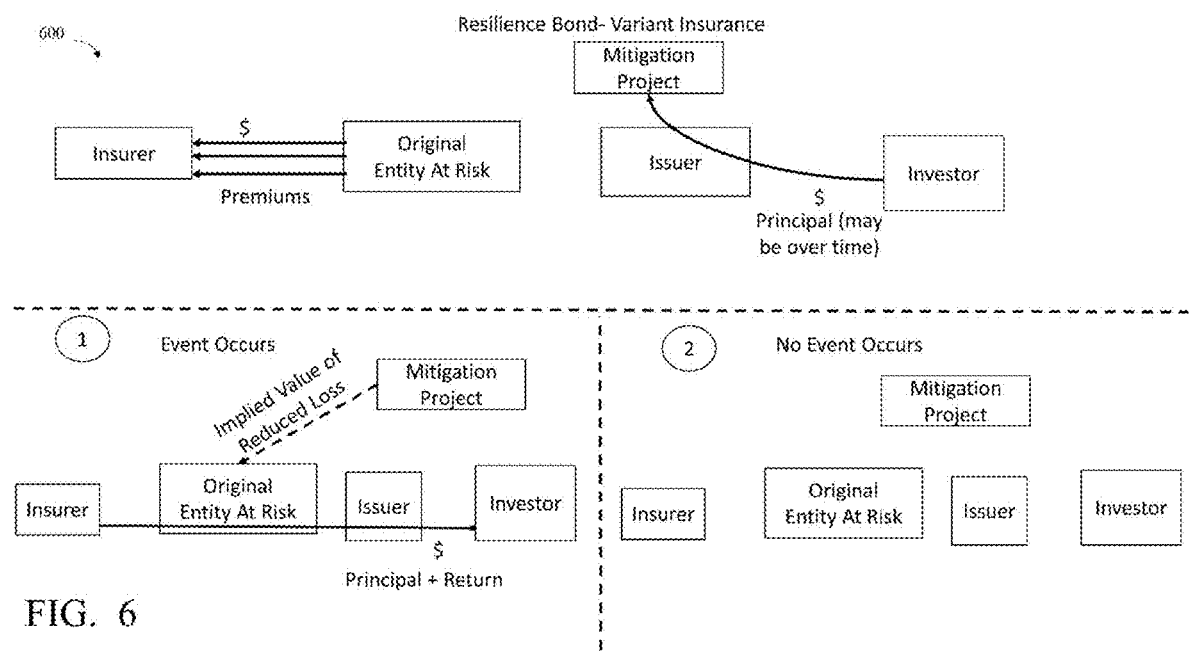
FIG. 6 is an insurance variant illustrating how a variant Resilience Bond may operate with an insurer insuring the conditional payout of the resilience bond, issued as illustrated.

FIG. 6 is an overview drawing flowchart 600 of an insurance variant illustrating how a variant Resilience Bond may operate with an insurer insuring the conditional payout of the resilience bond. Here the insurer insures the mitigated catastrophe and receives premiums over time from the entity at risk, which would only collect claims from the insurer if said catastrophe occurs.

Figure 7:
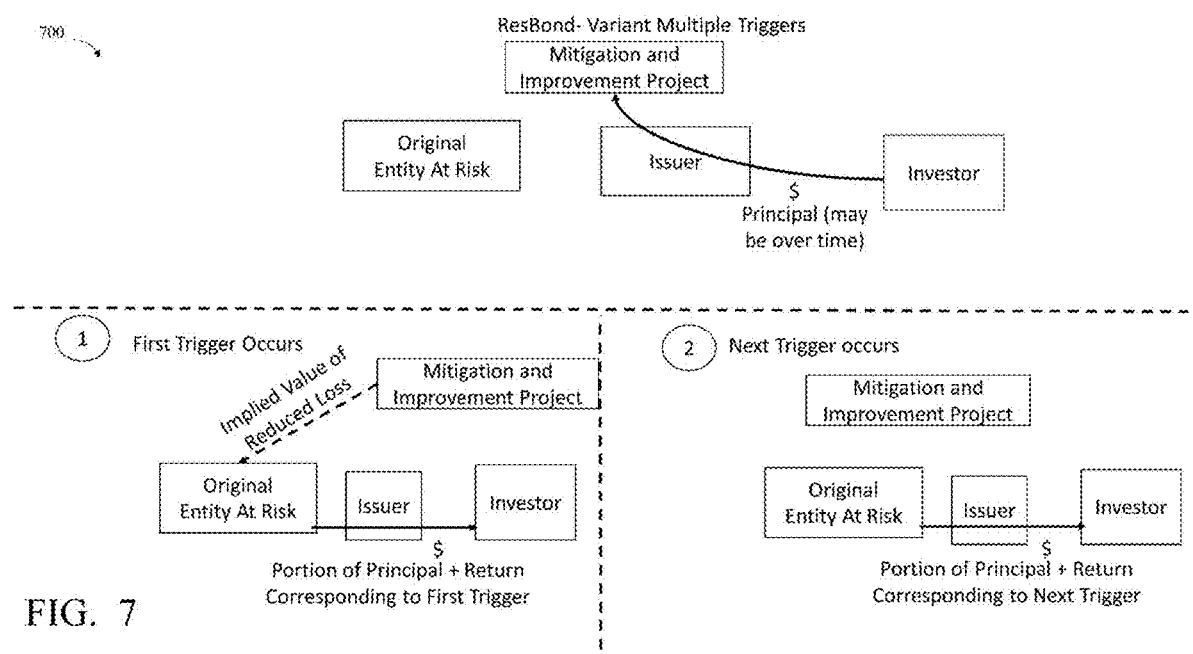
FIG. 7 is an overview drawing of flowchart for a ResBond (combination Resilience and Restoration Bond) with multiple triggers, in which both a Mitigation Project and an Improvement Project are funded by an investor, with the investor providing funds through an issuer via one or more principal payments, which may be made over time.

FIG. 7 is an overview drawing of flowchart 700 for a ResBond (combination Resilience and Restoration Bond) with multiple triggers, in which a project that both protects against loss and provides potential positive value (i.e., one that is simultaneously a Mitigation Project and an Improvement Project) is funded by an investor, with the investor providing funds through an issuer via one or more principal payments, which may be made over time. If no event or trigger occurs prior to the conclusion of the Bond's term, no payments are made; if, however, one or more triggers is met or one or more events takes place, the project confers an implied value of reduced loss or provides value directly, depending on the specific type of event or trigger, on the OEAR which pays one or more portions of the principal and return back to said investors.

Figure 8:
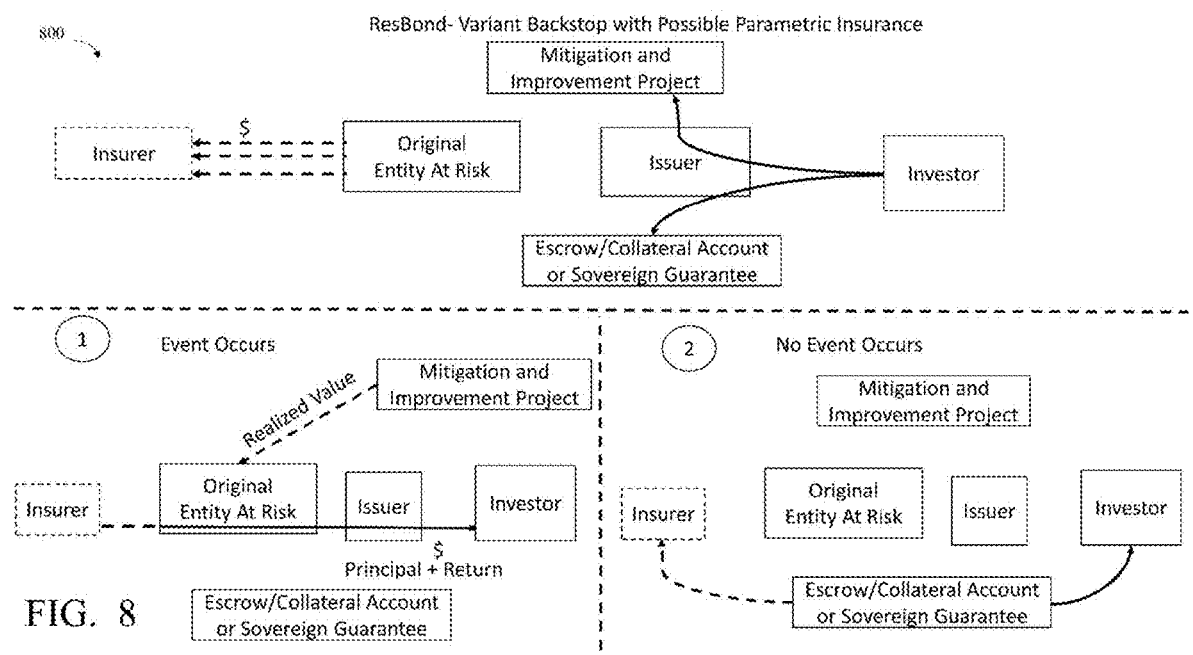
FIG. 8 is an overview drawing of flowchart for a ResBond Backstop variant, illustrating how a variant ResBond may operate with a backstop being an escrow, collateral account or a sovereign guarantee and being used to insure investors money and in some embodiments one or more insurers insuring the conditional payout of the ResBond, issued as illustrated.

FIG. 8 is an overview drawing of flowchart for a ResBond Backstop variant, illustrating how a variant ResBond may operate with a backstop being an escrow, collateral account or a sovereign guarantee and being used to insure investors' money and in some embodiments one or more insurers insuring the conditional payout of the ResBond, issued as illustrated. Here a backstop is paid into in some such embodiments and depending on the occurrence of a catastrophe the issuer and/or insurer may be paid back. In embodiments comprising an insurer, the insurer insures that the mitigated catastrophe and receives premiums over time from the entity at risk, which would only collect claims from the insurer if said catastrophe occurs.

Figure 9:
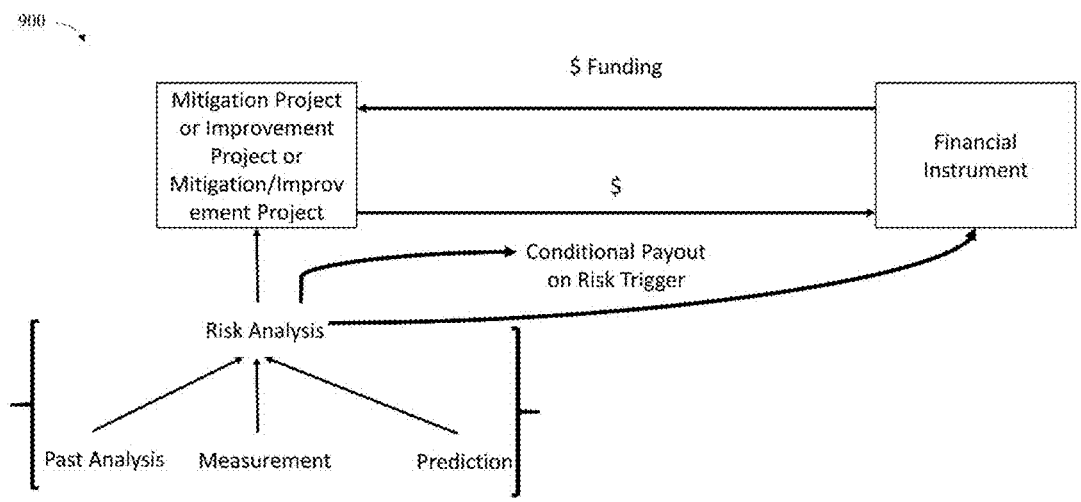
FIG. 9 is a flowchart illustrating an embodiment of the present disclosure in which the payout of a financial instrument (including but not limited to a bond, annuity or bank note) is made conditionally based on the installation, success and failure of a mitigation project in reducing the damage done by a predicted, analyzed or measured event, the funding for the mitigation project itself being a portion of the financial instrument.

FIG. 9 is an overview drawing of a flowchart illustrating an embodiment of the present disclosure in which the payout of a financial instrument (including but not limited to a bond, annuity or bank note) is made conditionally based on the installation, success and failure of a mitigation project in reducing the damage done by a predicted, analyzed or measured event, the funding for the mitigation project itself being a portion of the financial instrument.

Figure 10:
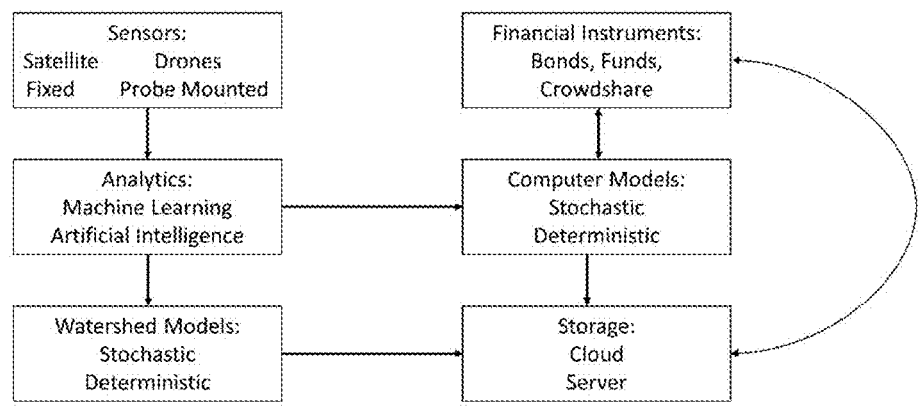
FIG. 10 is a flowchart showing an embodiment of the present disclosure showing the connections between episodic sensors, computing devices and payouts from electronic databases.

FIG. 10 is an overview drawing of a flowchart 1000 showing an embodiment of the present disclosure in which the connection between one or more types of sensors, connected to one or more analytical computing devices, said computing devices creating one or more computer models, uploading data regarding said analytics to one or more storage databases, or uploading data regarding said analytics in determining the management of one or more financial instruments, to one or more storage databases.

Figure 11:
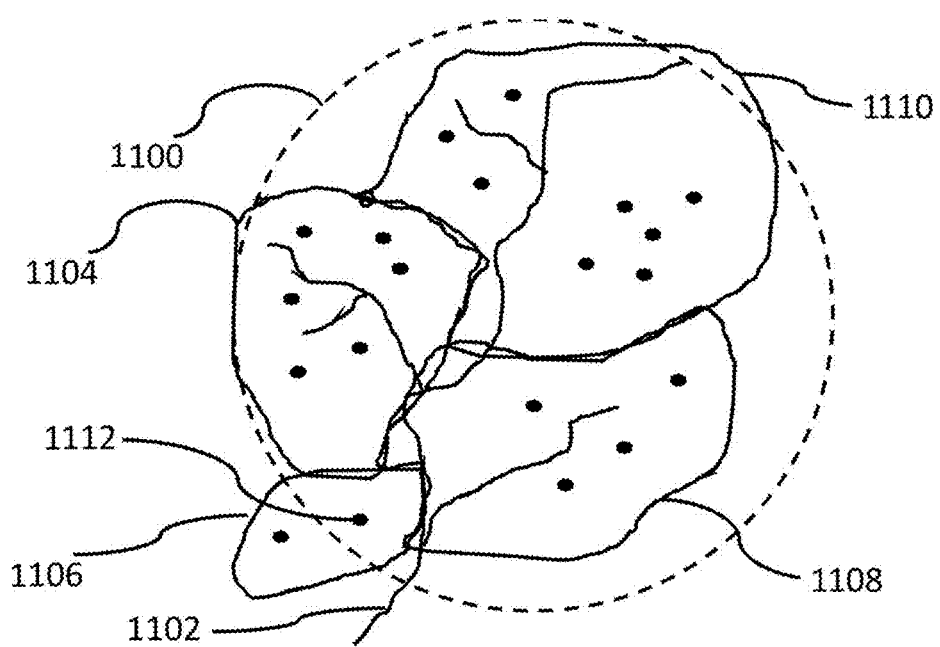
FIG. 11 is a drawing showing the method in which total max daily loading currently applied along point sources while ignoring non-point sources in multiple adjacent jurisdictions respectively housing portions of a river and its associated tributaries.

FIG. 11 is a drawing showing a method for a watershed analytics area 1100 in which total max daily loading currently applied along point sources 1112 while ignoring non-point sources in multiple adjacent jurisdictions 1104, 1106, 1108, 1110 respectively housing portions of a river 1100 and its associated tributaries. In some such embodiments a multijurisdictional contract may be made where certain criteria are set that if measured by the analytics at point sources in the area as outside of one or more acceptable ranges constitute an event which would trigger a financial instrument such as a resilience bond, where some or all payments are conditional based on said real-world (3rd party events). Real world events may be one or more environmental events that may be mitigated by analytics and/or mitigation projects including but not limited to achieving a predetermined water quality goal (such as pollution reduction, achieving a specific reduction in Nitrogen levels, or reducing sediment percentages) or an event causing actual loss to one party to the instrument or that would cause loss but for a mitigation project funded by the instrument. In some such embodiments specific examples may include but are not limited to having total nitrogen levels measured at one or more specific points in the stream below 8 mg/L any day in a given calendar year, a power outage causing damage to computing equipment and loss of data, reducing nitrogen levels to below a future EPA TMDL of 6 mg/L in advance, or reducing Sediment erosion to below 40%. Some such embodiments may involve a 3$^{rd}$ party monitoring and measuring the aforementioned fixed criteria such that a fair determination can be made that the event has occurred. Some such embodiments may also involve bids made on concession with one or more governments (local, regional, or national) making one or more annual payments to a private entity which pays for pollution reduction. In some such embodiment this may be a contract with term lengths (for example 10 years) which includes offramps for failure. One example may involve each payment being conditional at 1 million per year based on whether or not sufficient reduction occurred as determined by the aforementioned 3$^{rd}$ party.

Figure 12:
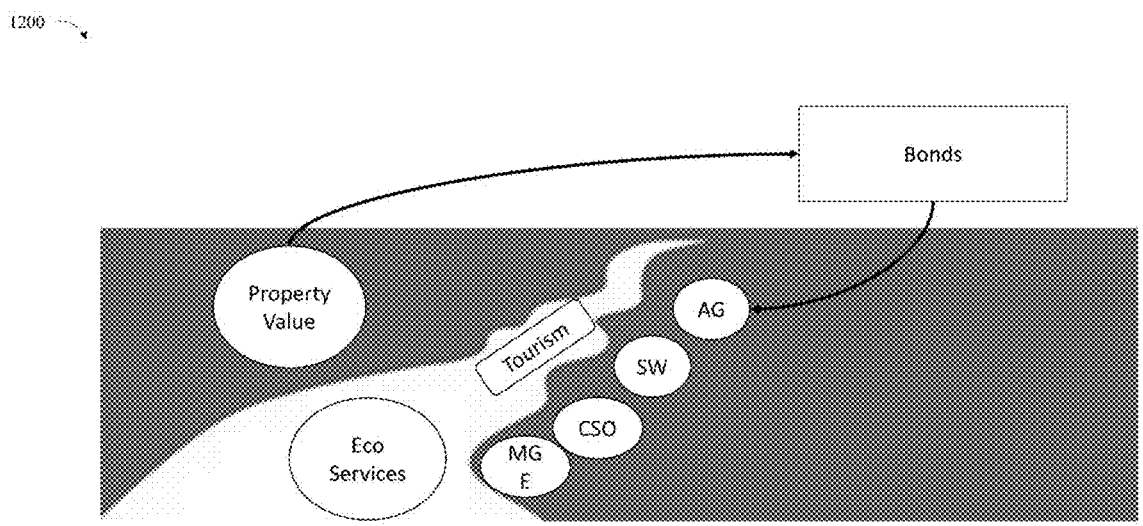
FIG. 12 is a diagram showing a particular embodiment of the present disclosure in which a financial instrument is paid conditionally based on the success of an invested-in project.

FIG. 12 is an overview drawing diagram 1200 showing a particular embodiment of the present disclosure in which a financial instrument, in this case being a bond/annuity, is paid conditionally based on the success of an invested in project achieving success in reaching one or more goals, in this case being agricultural improvement, stormwater improvement, combined sewage overflow treatment, increased millions of gallons of effluent treated, resulting in factors such as improved tourism, ecological services or property value, being the bargained for legal detriment that the bond payers are investing in, and therefore the triggers for one or more releases or non-releases of payments.

Figure 13:
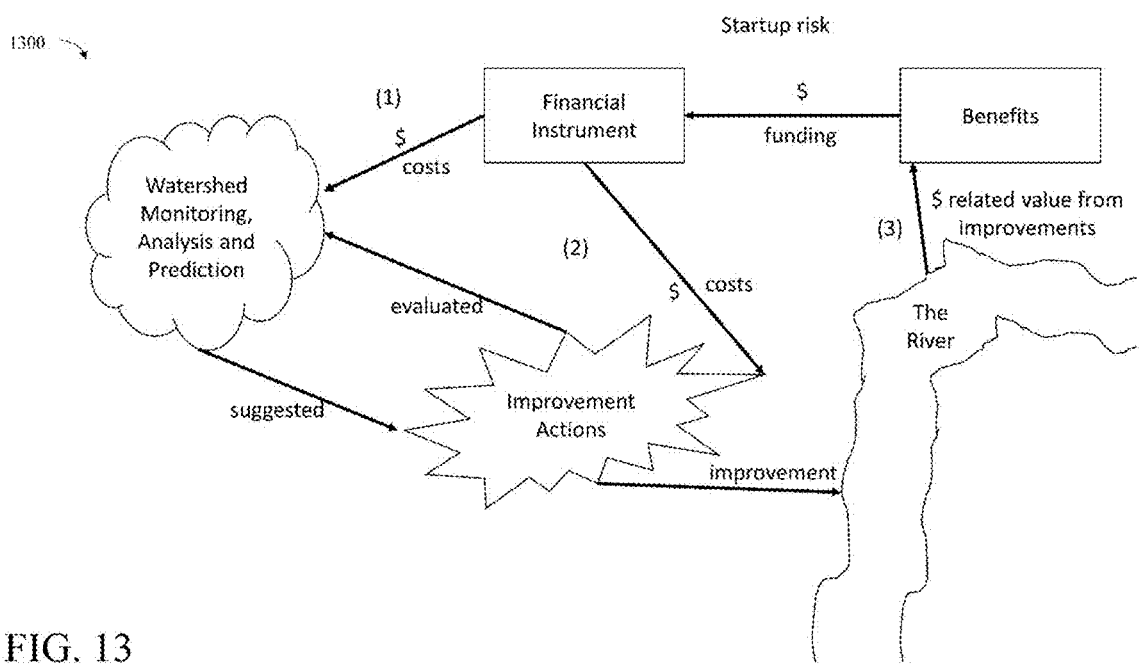
FIG. 13 is a flowchart showing an embodiment of the present disclosure multiple triggers may be set for financial transactions.

FIG. 13 is an overview drawing for a flowchart 1300 showing an embodiment of the present disclosure in which three particular payouts from a financial instrument, first being investors paying for the cost of a watershed monitoring, analysis and or prediction system, said system driving an improvement action, which if achieved within a desired criterion or criteria (including but not limited to time, cost, or jobs created) triggers a second payout from said financial instrument, said action driving improvements to a local watershed, and if the value from said improvements reaches a predetermined set-point threshold a third payment will be triggered from said financial instrument while the financial instrument may also prove self-funding if the value from related improvements is high enough.

Figure 14:
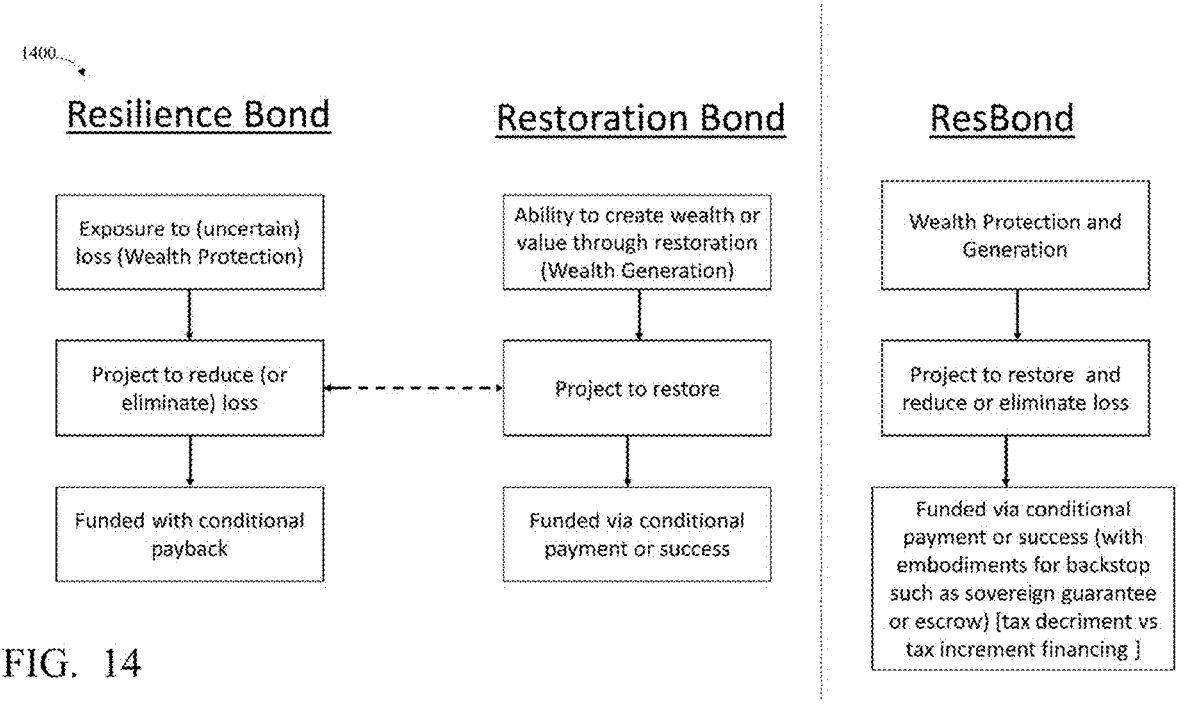
FIG. 14 illustrates an overview drawing for a flowchart showing a comparison between a Resilience Bond, a Restoration Bond, and a ResBond.

FIG. 14 illustrates an overview drawing for a flowchart 1400 showing a comparison between a Resilience Bond, a Restoration Bond, and a ResBond. While a Resilience Bond may be designed to ensure wealth protection by reducing or protecting from exposure to uncertain loss, by funding a mitigation project to reduce or eliminate said loss, with a conditional payback, a Restoration Bond seeks to create wealth or value through restoring an environment via a restoration project funded using a conditional payment or success. While similar the main difference is in the purpose of the project, not in the actual payment structure. In some such embodiments these bonds may be combined into a ResBond, which seeks to both protect wealth and generate wealth, via a project that both seeks to restore an environment and reduce or eliminate loss. This project is also funded via conditional payment or success, while some embodiments for all may include backstop payments or guarantees, including but not limited to tax decriment or tax increment financing.

Figure 15:
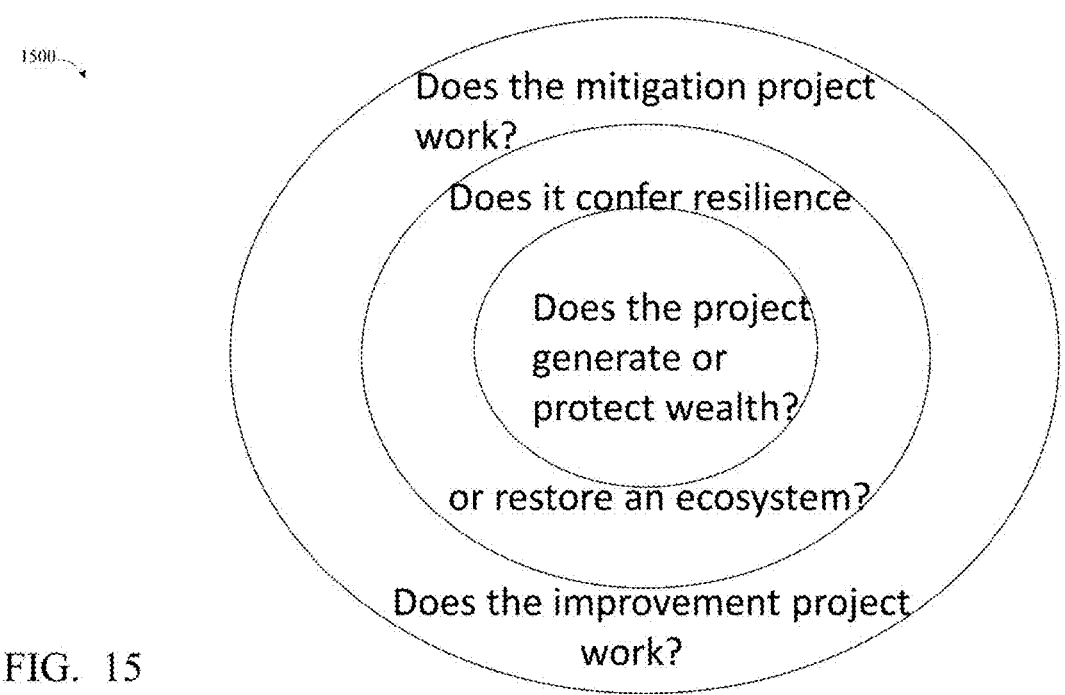
FIG. 15 is an overview drawing depicting three conditional triggers for a Restoration, Resilience or a ResBond.

FIG. 15 is an overview drawing diagram 1500 depicting three conditional triggers for a Resilience, Restoration, or a ResBond. While the first trigger may be if the system determines that the mitigation project or improvement project works (for example a dam that is built and does not crumble, a wastewater treatment plant that is built and is operational, or trees that are planted and begin growing), a second trigger may be reached if the project confers resilience and/or restores an environment (for example a dam that protects from a flood, a wastewater treatment plant that causes fish population in a local bay to rise, or an afforestation project that causes trees to grow which mitigate damage from a hurricane and beautify an area), and an additional trigger may be reached if the project generates or protects wealth (for example a dam that protects against a major flood, which protects a down from major damage, a wastewater that beautifies a river thus bringing tourism to a region, or an afforestation project that brings tourism to a region by beautifying it and protects a township from damage and flooding due to a hurricane). In each of these triggers a payment may be conditionally released based on the performance or non-performance of the associated project. In some such embodiments money may be held in escrow, protected by a sovereign guarantee or otherwise released to insure such payments.

Figure 16:
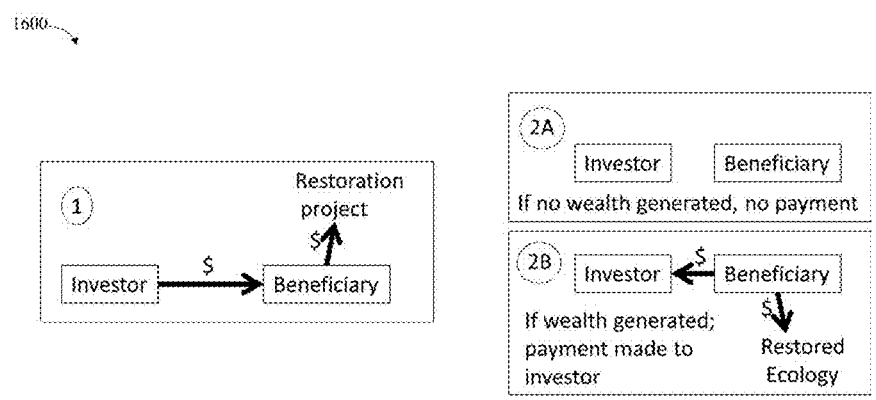
FIG. 16 is an overview drawing depicting a simple depiction of how a Restoration Bond and its conditional payout work.

FIG. 16 is an overview drawing showing a simple depiction 1600 of how a Restoration Bond and its conditional payout works. Initially an investor pays a beneficiary who uses those funds to build a restoration project. If the restoration project is successful and wealth is generated the beneficiary benefits from the restored ecology and pays the investor back accordingly, typically with interest and additional payments to make it worth the investors interest. In the case that no wealth is generated there is no additional payment made and the investor loses on their gamble.

Figure 17:
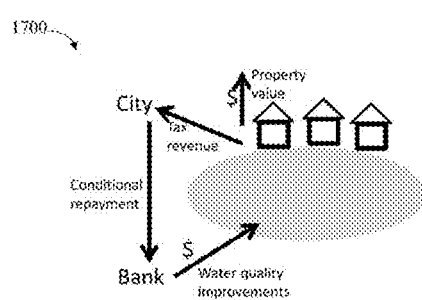
FIG. 17 is an overview drawing of a polluted lake, which could be improved through modern wastewater treatment of sewage and industrial waste. This drawing depicts how the lake could be restored utilizing a restoration bond solution.

FIG. 17 is an overview drawing of a sequence 1700 of a restoration bond for a polluted lake, which could be improved through modern wastewater treatment of sewage and industrial waste. This drawing depicts how the lake could be restored utilizing a restoration bond solution with payments made by a bank to improve water quality. If water quality improves the property values improve and the tax revenue generated to the city results in a large conditional payment to the bank. If the result is not positive within the set timeframe the bank receives no conditional payment.

Figure 18:
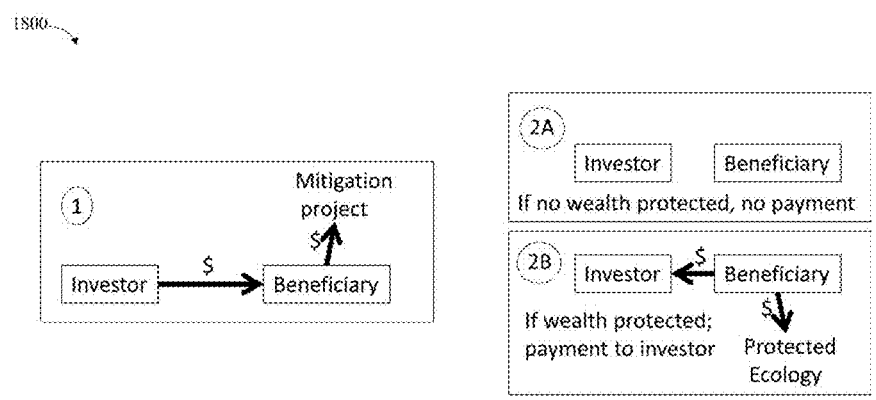
FIG. 18 is an overview drawing depicting a simple depiction of how a Resilience Bond and its conditional payout work.

FIG. 18 is an overview drawing showing a simple depiction 1800 of how a Resilience Bond and its conditional payout works. Initially an investor pays a beneficiary who uses those funds to build a mitigation project. If the mitigation project is successful and wealth is protected the beneficiary benefits from the protected ecology and pays the investor back accordingly, typically with interest and additional payments to make it worth the investors interest. In the case that no wealth is protected there is no additional payment made and the investor loses on their gamble.

Figure 19:
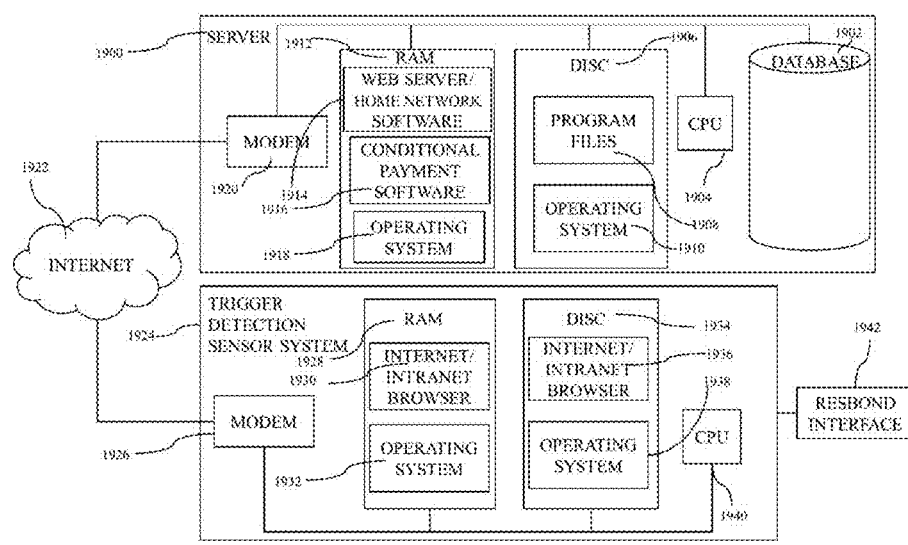
FIG. 19 is an exemplary flowchart showing the typical database hierarchy with data sent to and from a device including but not limited to a system of trigger detecting sensors or event detecting sensors using an application which may process a variety of functions to pay, not pay or adjust a payment accordingly to one or more users.

FIG. 19 is an exemplary flowchart showing the typical database hierarchy with data sent to and from a device including but not limited to a system of trigger detecting sensors or event detecting sensors using an application which may process a variety of functions including but not limited sensing when one or more preset triggers for restoration thresholds or event levels are met and sending data regarding said triggers or events to one or more devices or databases where that information may be stored and a decision made, including a decision to pay, not pay or adjust a payment accordingly to one or more users.

Figure 20:
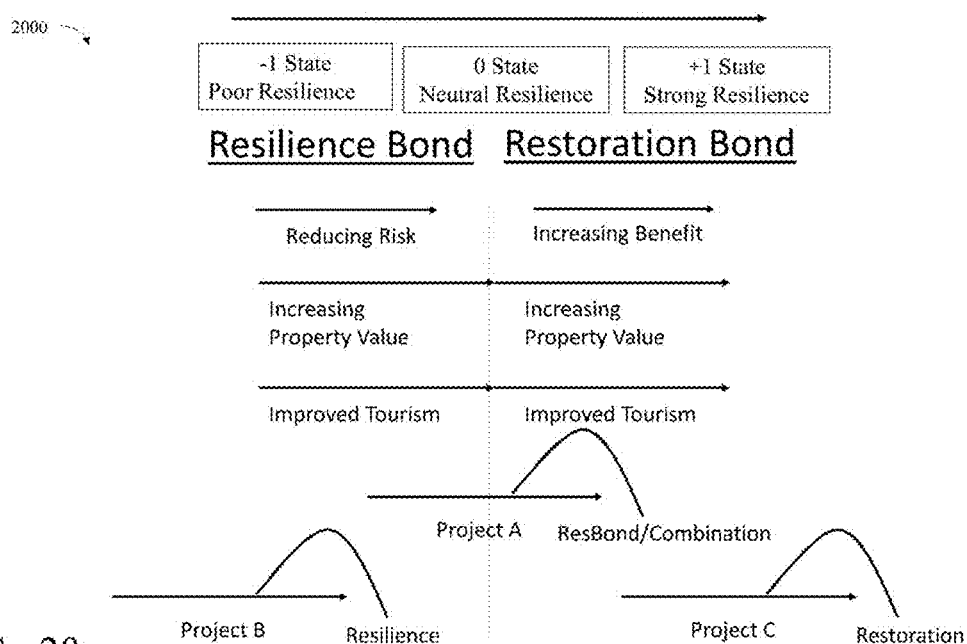
FIG. 20 is an exemplary comparison chart describing a continuum of resiliency states, showing an overview of the resilience improvement and increased benefit target of each bond coupled with increased property value and increased tourism as generated by either a combination ResBond in Project A, Resilience Bond in Project B or Restoration Bond in Project C.

FIG. 20 is an exemplary comparison chart describing a continuum of resiliency states, showing an overview of the resilience improvement and increased benefit target of each bond coupled with increased property value and increased tourism as generated by either a combination ResBond in Project A, Resilience Bond in Project B or Restoration Bond in Project C. From left to right each arrow shows increasing the resilience of a particular environment.

Figure 21:
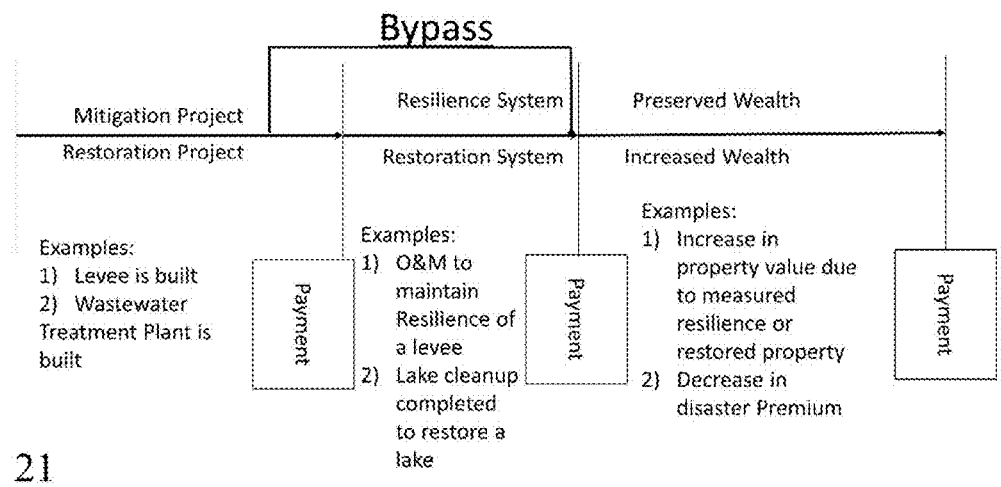
FIG. 21 is an exemplary diagram of ResBonds; a Resilience Bond or Restoration Bond System showing payment triggers and examples of triggers for each, where a payment may be bypassed in either type of project if one trigger is not met but a supplementary trigger is in some such embodiments.

FIG. 21 is an exemplary diagram of ResBonds; a Resilience Bond or Restoration Bond System showing payment triggers and examples of triggers for each, where a payment may be bypassed in either type of project if one trigger is not met but a supplementary trigger is in some such embodiments. In the first example a levee is built for a mitigation project or a wastewater treatment plant is built for a restoration project. If this is accomplished a payment is made. In the second example set an incentive for a resilience system for operations and maintenance to maintain a levee, or lake cleanup to be completed and restore a lake results in a conditional payment. The third example shows either preserved wealth by a decrease in disaster premium or an increase in property value due to resilience or restored property.

All of the examples of disclosure are for financial instruments (bonds) that directly fund infrastructure projects, however it is not required that the payout go to the investor if no disaster strikes or the original entity at risk if one does. This differs from the prior art for several important reasons. While a resilient infrastructure project may be valuable coupled with an insurance project in both, in every example of prior art, the Investor gets money when disaster strikes in every scenario. In some embodiments the disclosed resilience bond the sponsor may pay the money when disaster strikes instead. Having the insurer fund the project through the entity at risk, said insurer be funded via investment bonds, and the entity at risk (and in some embodiments the investors) make contingent payment(s) only if the disaster occurs such that the project protects them from damage (financial liability or physical damage). While the prior art may be suitable for a resilience project that protects an entity only partially by mitigating some of the damage, allowing the entity at risk to better respond, the present disclosure would be far superior if the resilience project protects the entity at risk from a substantial loss.

Examples of Resilience bonds with and without an insurer may further serve to illustrate the importance of the present disclosure. One of the goals of the disclosure is to ensure that the entity at risk is presented with a win-win scenario for engaging in a mitigation or ecosystem service project, and the investor always has a probability of a high return on investment (as does the insurer when present). Mathematically the benefits of such bonds may be understood.

describing the distribution, $d$ and $d_m$ are simply the expected values of the distributions. Though the concept is more theoretically sound if only one event can occur during each period $t$, multiple events could be accounted for in this damage function. As long as the damage distribution is independent of the other variables used here, the use of the expected value for $d$ and $d_m$ is appropriate. Note that $p$ could be included as a component of the damage function by an appropriately-sized mass located at \$0 without changing the analysis. There are bounds on possible values for P. The minimum possible payout ($P_0$) is one where the investor will break even, which is found by setting the investment's expected value to zero.

$$0 = E(INV) = P_0 p_d - C$$
$$P_0 = \frac{C}{p_d}$$

The maximum possible payout ($P_1$) is one where the issuer will break even, found by setting the issuer's expected value to zero.

$$0 = E(ISS) = P_1 p_d - D_m - R$$
$$P_1 = \frac{D_m + R}{p_1}$$

For a Resilience bond to be appropriate, the minimum payout must be less than the maximum. The bounds can be illustrated by an appropriate inequality, expanding all intermediate variables.

$$\frac{C}{1 - (1-p)^k} \leq P \leq \frac{d_m pk + R}{1 - (1-p)^k}$$

This bounds equation implicitly describes projects that are suitable for Resilience bond financing, namely, projects with

TABLE 1

Resilience bond Variables Defined for Various Outcomes; Insurance

| Variable | Description | Formula | Example Value |
|---|---|---|---|
| t | Length of time in which one or zero events can occur | | 1 day |
| T | Length of time for which the bond is active (years) | | 10 years |
| k | Number of periods t in period T | T/t | 3650 |
| p | Probability of an event occurring during time t | | 0.02% |
| $p_o$ | Probability of 0 events occurring during time T | $(1 - p)^k$ | 48% |
| $p_x$ | Probability of x events occurring during time T | $(_kC_x)p^x(1 - p)^{k-x}$ | For x = 2, 13% |
| $p_d$ | Probability of at least one event occurring during time T | $1 - p_0$ | 52% |
| d | Mean damage caused by an event | | \$15,000,000 |
| $d_m$ | Mean damage mitigated by the investment | $d_m < d$ | \$14,000,000 |
| C | Cost of mitigation project | | \$ 3,000,000 |
| R | Residual value of project after time T | | \$ 600,000 |
| D | Expected mean damages during time T | dpk | \$10,950,000 |
| $D_m$ | Expected mean mitigated damages during time T | $d_m$pk | \$10,220,000 |
| P | Payout to investor when event occurs | | \$10,000,000 |
| m | Marginal cost of insurance | | 5% |
| r | Annual rate of return on self-insurance | | 1.5% |

It is assumed that each period t is independent of each other period. The damages d and $d_m$ need not represent a single, fixed amount of loss resulting from an event; if losses are uncertain but with a known probability density function positive expected value versus the baseline exposure. If a project's net expected mitigation and residual value does not exceed its initial costs, the project has negative value, and no mutually acceptable payout can be found, since the upper bound on P will be less than the lower bound. Such projects may possibly be worth constructing if there are other benefits or if there are non-monetary components to the damages or risk but will not be suitable for a Resilience bond. The geometric mean of the upper and lower bounds may be an appropriate starting point for an issuer and investor to negotiate a payout. In a microgrid for example, the bounds and geometric mean may be $5.8 million, $19.7 million, and $10.7 million. Note that the upper bound is larger than the damages from a single event, a result that may be undesirable as it will create a scenario where the issuer's net realized value falls below zero. Capping a payout at one event's damages or mitigated damages may be wise. This analytical solution suggests how parameters can be varied to achieve a desired result. Typically, the probability of loss and amount of damage will be difficult to change, as they depend on the type of disaster and assets at risk. The cost may be variable, as the scope of the mitigation project could be expanded or contracted. The easiest variable to adjust is the time horizon: longer time horizons will increase the chances of one or more disasters, enabling a smaller payout to be made. This analysis neglects the time value of money, an important omission. Including this factor should not affect the comparison between the self-financed and Resilience bond-financed projects, as both will be discounted identically, but the insurance solution will be relatively more favorable. Also, depreciating future payments will tend to increase the necessary payouts, as the investor must allocate significant assets at the start, while payoffs will only be made on average at time T/2.

The Resilience bond concept presented here can be modified in a variety of ways to meet specific situations or market conditions. Each variant is described and appropriate situations are suggested; a full analysis is not completed for all of the variants presented. First, a Resilience bond can be used for only a portion of the mitigation project. The remainder could be funded through standard bond issuances, pay-go, or any other appropriate means. Should the anticipated disaster not happen, the issuer would have paid the portion of the non-Resilience bond money to complete the project without any realized return. An issuer may prefer to split the risk of that result, rather than offload it entirely, or may be averse to relying too heavily on a new financial instrument. This approach may also be appropriate for mitigation projects that provide value in other ways: an issue could, depending on the precise numbers, use traditional financing up to the non-mitigation value of the project, then finance the remainder with a Resilience bond. For example, assume a particular project costs $10 million, carries an annual payback of $500,000, and mitigates a 20% risk over 10 years of a $50 million loss. Traditional financing could supply half of the project's cost ($5 million) with a more acceptable 10-year simple payback; a Resilience bond could supply the remainder carrying a $35 million payout on the event's occurrence. Even though neither method could successfully fund the entire project (assuming a 20-year payback is inadequate), in combination, the issuer is able to realize the project's overall value. Second, a Resilience bond could be modified by changing the payout conditions or value in several ways. The payout occurs as a fixed lump sum that takes place when the first disaster that the mitigation project protects against occurs. The payout could instead be paid on every occurrence of the event, not just the first; this modification would reduce the necessary payout but increase the chance of large loss to the issuer (though still smaller than the corresponding loss without the Resilience bond plus mitigation project) and the reduction of that chance is one of the advantages of the bond. Separately, the payout could be a variable amount, rather than a fixed sum, depending on any appropriate variable. This approach is most sensible with disasters that can occur in varying degrees, such as hurricanes; the payout could be larger for a category 4 hurricane than a category 3. One could also set a threshold level of disaster for any payout, for instance, no payout for tropical storms. Though it would add complication and require a third party to verify the hypothetical, the payout could be scaled on mitigated damages rather than the scale of the event itself. These changes do not affect the basic analysis and any spread of damages will have a central moment that should yield the maximum and minimum prices. Third, the timing of the payout could be altered. It may be difficult for an issuer dealing with a crisis to make the additional Resilience bond payment immediately. The contract could call for payment to be made after a specified time period, perhaps one year, to allow for immediate recovery and incorporation of the impact of the disaster and payout into a fiscal plan. Alternatively, the payout could be made in a series of installments, or even as a traditional fixed-length bond with coupon payments and a final principal, such that the coupon payments do not begin until and if the disaster takes place. Of course, the payout would need to be higher to compensate the investor for the lost time value of money. Finally, the bond could be modified to include a traditional coupon payment, along with the upfront capital provided by the investor and the conditional payout provided by the issuer. The coupon could be paid in either direction. If the mitigation project has significant operational costs, the investor could provide appropriate funding to maintain the protection, with, of course, an appropriate increase in the payout. Alternatively, the issuer could provide regular coupon payments to the investor, perhaps below the market rate of interest, thus reducing the all-or-nothing nature of the Resilience bond from the investor's perspective. The payments could last until the disaster occurs, with the payout taking the place of the principal return in a traditional bond. The issuer could also release a traditional bond to fund the mitigation project, with the investor assuming the coupon payments until the disaster occurs, at which point they would become the issuer's obligation. The final principal payout would be similarly conditioned. Other variations with coupon payments are possible and may be appropriate depending on circumstance.

TABLE 2

Comparison of microgrid financing expected values

|  | EV | Formula | Net EV |
| --- | --- | --- | --- |
| Baseline Risk | −$11 million | dpk | $0 |
| Self-Financed | −$3.1 million | $C + (d - d_m)pk - R$ | $7.8 million |
| Resiliency Bond | −$5.4 million | $P_{pd} + (d - d_m)pk - R$ | $5.6 million |
| Insurance | −$11.5 million | $dpk(1 + m)$ | −$0.5 million |

TABLE 2-continued

Comparison of microgrid financing expected values

| | EV | Formula | Net EV |
|---|---|---|---|
| Self-Insurance | −$8.6 million | $dpk - d(1 + r)^T$ | $2.4 million |
| Bond + Insurance | −$5.6 million | $P_{pd}(1 + m) + (d - d_m)pk - R$ | $5.4 million |
| Bond + Self-Insurance | −$4.0 million | $P_{pd} + (d - d_m)pk - P(1 + r)^{T/2} - R$ | $7.0 million |

Table 2 presents all of the calculated expected values for the microgrid example in a single place. The Net Expected Values are generated by subtracting the real EV from the baseline unaddressed risk exposure. Note that dpk (Baseline Risk [Mean damage caused by an event, times the probability of an event occurring during time t, times the number of periods t in period T]) appears as a term in all formulas, allowing relatively clean subtraction of the baseline. Also, note that three options require outlay or set-aside of large capital dollars at the start of the period: self-financing ($3 million), self-insurance ($15 million), and a Resilience bond+self-insurance ($10 million). The expected value is not the sole measure of project value or feasibility. Table 3 presents the outcome results and net realized value versus the baseline case of no microgrid and no insurance for all of the financing mechanisms described. Note that with a Resilience bond (unlike in the prior art the issuer need not lay out any capital dollars and never suffers a negative financial result: across the outcomes, the net realized value is always positive.

TABLE 3

Comparison of microgrid financing mechanisms for various outcomes

| | No Outages | One Outage | Two Outages | Three Outages | Four Outages |
|---|---|---|---|---|---|
| Probability | 48% | 35% | 13% | 3% | 1% |
| No microgrid | $0 | −$15 million | −$30 million | −$45 million | −$60 million |
| Self-Financed | −$2.4 million | −$3.4 million | −$4.4 million | −$5.4 million | −$6.4 million |
| Resiliency Bond | $600,000 | −$10.4 million | −$11.4 million | −$12.4 million | −$13.4 million |
| Insurance | −$11.5 million | −$11.5 million | −$11.5 million | −$11.5 million | −$11.5 million |
| Self-Insurance | $2.4 million | −$12.6 million | −$27.6 million | −$42.6 million | −$57.6 million |
| Bond + Insurance | −$4.9 million | −$5.9 million | −$6.9 million | −$7.9 million | −$8.9 million |
| Bond + Self-Insurance | $2.2 million | −$9.2 million | −$10.2 million | −$11.2 million | −$12.2 million |
| Self-Financed | −$2.4 million | $11.6 million | $25.6 million | $39.6 million | $53.6 million |
| Resiliency Bond | $600,000 | $4.6 million | $18.6 million | $32.6 million | $46.6 million |
| Insurance | −$11.5 million | $3.5 million | $18.5 million | $33.5 million | $48.5 million |
| Self-Insurance | $2.4 million | $2.4 million | $2.4 million | $2.4 million | $2.4 million |
| Bond + Insurance | −$4.9 million | $9.1 million | $24.1 million | $38.1 million | $51.1 million |
| Bond + Self-Insurance | $2.2 million | $5.8 million | $19.8 million | $33.8 million | $47.8 million |

Resilience bonds, Ecosystem Service Bonds and the business methods, systems of sensors and apparatuses revealed in the present disclosure have great potential to enable new infrastructure spending but require that entities exposed to risk and the broader market embrace the principle of acknowledging the preexisting exposure. Barriers both practical and psychological must be overcome before Resilience bonds and Ecosystem Service Bonds will be widely implemented. The present disclosure seeks to further the art by informing those of ordinary skill on how to overcome those barriers. Within the invention, when a singular term is used, a plural term is also possible, and when a plural term is used, a singular term is also possible. A series of events and payouts can also occur in parallel and vice versa. The specific series of occurrences can be interchanged or even reversed. A project can include a program, a structure, an infrastructure, a device, a machine, a tool, an equipment, or any physical, chemical, biological or human intervention that can assist in a mitigation or an improvement or to restore or confer resilience to a system or method.

The invention is not limited to the structures, methods and instrumentalities described above and shown in the drawings. The invention is defined by the claims set forth below.

What is claimed and desired to be protected by Letters Patent of the United States is:

1. A method to measure a mitigation or improvement for a watershed or airshed comprising:
   automatically detecting and measuring, using one or more episodic sensors, including acute or chronic event detectors in the watershed or airshed, a condition of the watershed or airshed comprising one or more of a quantifiable air, water, or soil quality or quantity change after the mitigation or improvement;
   analyzing, by one or more computing devices, data regarding the condition of the watershed or airshed detected by the one or more episodic sensors and data regarding one or more predetermined set points to determine whether one or more real world events have occurred, the one or more real world events comprising reaching the one or more predetermined set points, the data regarding the condition of the watershed or airshed comprising one or more real world events, and the achievement or non-achievement of one or more predetermined set points provided on one or more digital storage databases within a specified time, and
   upon occurrence of the one or more real world events, informing the attainment or non-attainment of the mitigation or improvement;
   wherein the one or more episodic sensors is fixed, probe mounted, fixed on a satellite, or mounted to an airborne, floating or submarine drone;
   wherein the improvement or mitigation is a program, a structure, an infrastructure, a device, a machine, a tool, an equipment, or any physical, chemical, biological intervention for air or water pollution reduction or flood, wind or earthquake management;

wherein the one or more episodic sensors are configured to detect the occurrence of the one or more real world events and the achievement or non-achievement of the one or more predetermined set points or to model whether the mitigation or improvement has performed adequately or inadequately;

wherein an action is triggered when said one or more computing devices determines that the mitigation or improvement restores or confers sufficient resilience, or fails to restore or fails to confer resilience; and wherein the one or more real world events is:
a flow, chlorophyll, water clarity or other water quality or water quantity target, a flood damage, power outage, earthquake severity, or a comparison of a height of a flood wall constructed to a height of an occurring flood, or
a wind speed, wind velocity, or air quality target.

2. A system for measuring a mitigation or improvement for a watershed or airshed, comprising:
one or more computing devices; and
one or more episodic sensors, including acute or chronic event detectors in the watershed or airshed, configured to detect a condition of the watershed or airshed, comprising one or more of a quantifiable air, water, or soil quality or quantity change after the mitigation or improvement;
wherein the one or more computing devices are configured to
receive data from the one or more episodic sensors;
analyze the data from the one or more episodic sensors and other sources to determine whether one or more real world events have occurred, the one or more real world events comprising reaching a one or more predetermined set points related to the watershed or airshed, the one or more predetermined set points comprising one or more respective real world events of the one or more real world events or detecting achievement or non-achievement of a predetermined goal for the watershed or airshed within a specified time; and
upon occurrence of the one or more real world events, inform the attainment or non-attainment of the improvement or mitigation;
wherein the one or more episodic sensors is fixed, probe mounted, fixed on a drone, fixed on a satellite, or mounted to an airborne, floating or submarine drone;
wherein the improvement or mitigation is a program, a structure, an infrastructure, a device, a machine, a tool, an equipment, or any physical, chemical, biological intervention for air or water pollution reduction or flood, wind, or earthquake management;
wherein the one or more episodic sensors are configured to detect the occurrence of the one or more real world events and the achievement of the one or more predetermined set points or to model whether the mitigation or improvement has performed adequately or inadequately;
wherein an action is triggered when said one or more computing devices determines that the mitigation or improvement restores or confers sufficient resilience, or fails to restore or fails to confer resilience; and
wherein the one or more real world events is:
a flow, chlorophyll, water clarity or other water quality or water quantity target, or,
a flood damage, power outage, earthquake severity, or a comparison of a height of a flood wall constructed to a height of an occurring flood, or
a wind speed, wind velocity, or air quality target.

3. A system for measuring a mitigation or improvement for a watershed or airshed, comprising:
instructions to cause one or more computing devices to receive measurements from one or more episodic sensors, including acute or chronic event detectors in the watershed or airshed, that detect data regarding a condition of the watershed or airshed comprising one or more of a quantifiable air, water, or soil quality or quantity change after the mitigation or improvement;
one or more digital storage databases for housing data regarding one or more predetermined goals and data comprising one or more respective real world events or detecting achievement or non-achievement of a predetermined goal for the watershed or airshed within a specified time; and
one or more computer models being held on one or more servers and/or being hosted on a computer to
analyze performance of the mitigation or improvement for the watershed or airshed by automatically measuring attainment or non-attainment of a desired performance of the mitigation or improvement by one or more computing devices by analyzing the data from the one or more episodic sensors and the data regarding the one or more predetermined goals to determine whether the one or more real world events have occurred, the one or more real world events comprising reaching one or more predetermined goals, the one or more predetermined goals comprising the one or more respective real world events of the one or more real world events or detecting achievement or non-achievement of a predetermined goal for the watershed or airshed within a specified time, the analysis occurring by means of one or more of machine learning, artificial intelligence, stochastic modeling, and deterministic modelling; and
upon occurrence of the one or more real world events, inform the attainment or non-attainment of the mitigation or improvement;
wherein the one or more episodic sensors is fixed, probe mounted, fixed on a drone, fixed on a satellite, or mounted to an airborne, floating or submarine drone;
wherein the improvement or mitigation is a program, a structure, an infrastructure, a device, a machine, a tool, an equipment, or any physical, chemical, biological intervention for air or water pollution reduction or flood, wind, or earthquake management;
wherein the one or more episodic sensors are configured to detect the occurrence of real world events and the achievement of predetermined goals in order to model whether the mitigation or improvement has performed adequately or inadequately;
wherein an action is triggered when said one or more computing devices determines that the mitigation or improvement restores or confers sufficient resilience, or fails to restore or fails to confer resilience; and
wherein the one or more real world events is:
a flow, chlorophyll, water clarity or other water quality or water quantity target,
a flood damage, power outage, earthquake severity, or a comparison of a height of a flood wall constructed to a height of an occurring flood, or
a wind speed, wind velocity, or air quality target.

4. The method of claim 1, wherein a trigger is reached when said one or more computing devices determines that the mitigation or improvement functions or does not function to a minimal level.

5. The non-transitory computer-readable medium of claim 3, wherein the one or more sensors are used to detect occurrence of real world events and transmit data regarding said occurrence to the one or more computing devices.

6. The system of claim 2, further comprising one or more digital storage databases held on a server and/or one or more of said digital storage databases being located on a cloud computing database and the analyzing occurs by the means of machine learning, artificial intelligence, stochastic modeling or deterministic modelling.

* * * * *

UNITED STATES PATENT AND TRADEMARK OFFICE
CERTIFICATE OF CORRECTION

PATENT NO. : 11,823,159 B2  
APPLICATION NO. : 16/522629  
DATED : November 21, 2023  
INVENTOR(S) : Saul Kinter et al.

Page 1 of 1

It is certified that error appears in the above-identified patent and that said Letters Patent is hereby corrected as shown below:

On the Title Page

Column 1, item (73) Assignee:  
Delete "(73) Assignee: RESILIENCE FINANCING, LLC., Middletown. DE (US)"

Insert --(73) Assignee: RESILIENCE FINANCING, INC., Middletown. DE (US)--

Signed and Sealed this  
Fourth Day of March, 2025

Coke Morgan Stewart  
*Acting Director of the United States Patent and Trademark Office*